April 12, 1955   L. H. LANGE ET AL   2,705,905
BOX-WRAPPING SYSTEMS

Filed Aug. 28, 1950   11 Sheets-Sheet 1

INVENTORS.
LUDWIG H. LANGE
WALTER E. FLACK
BY
Woodcock and Phelan
ATTORNEYS

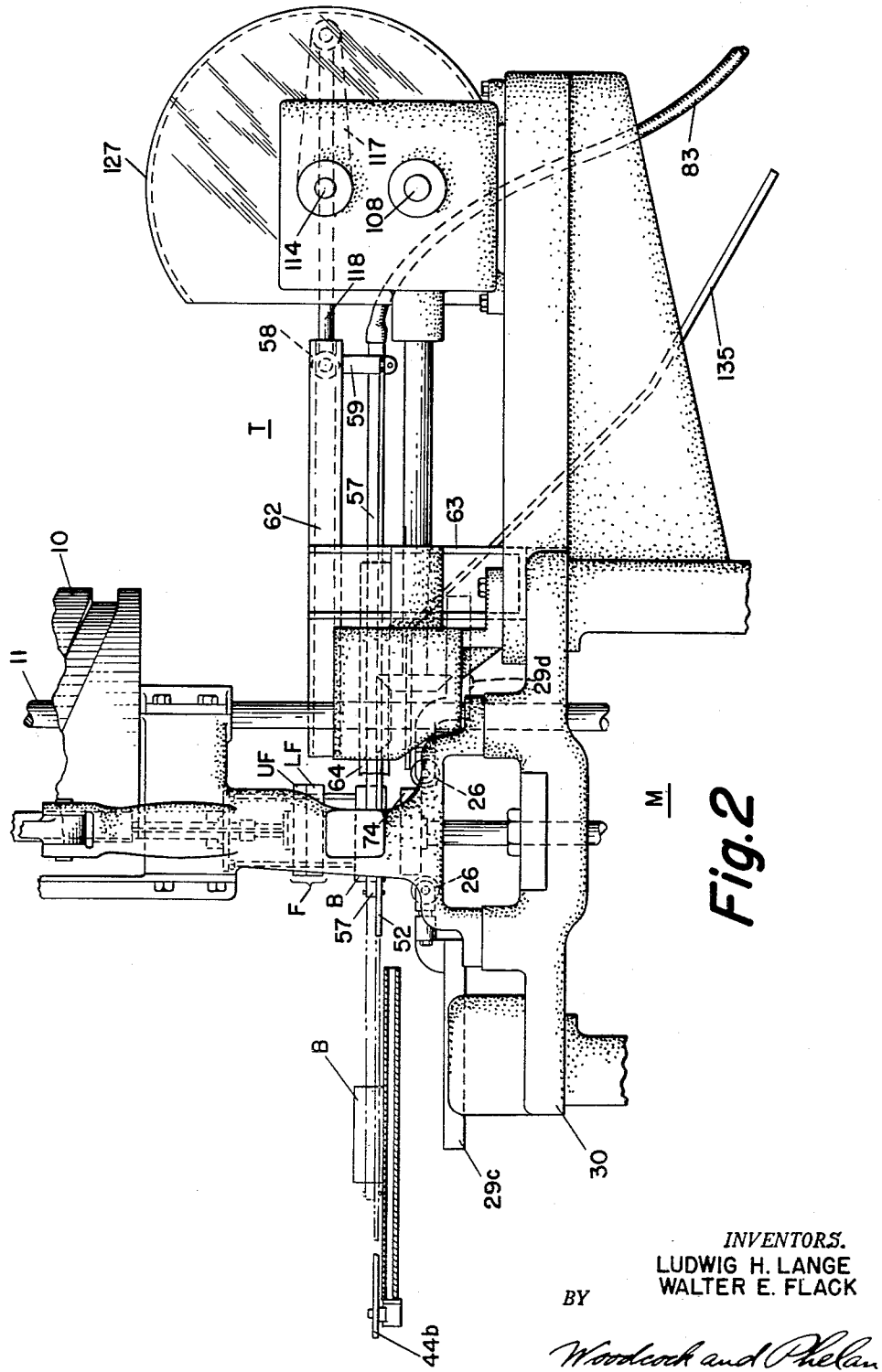

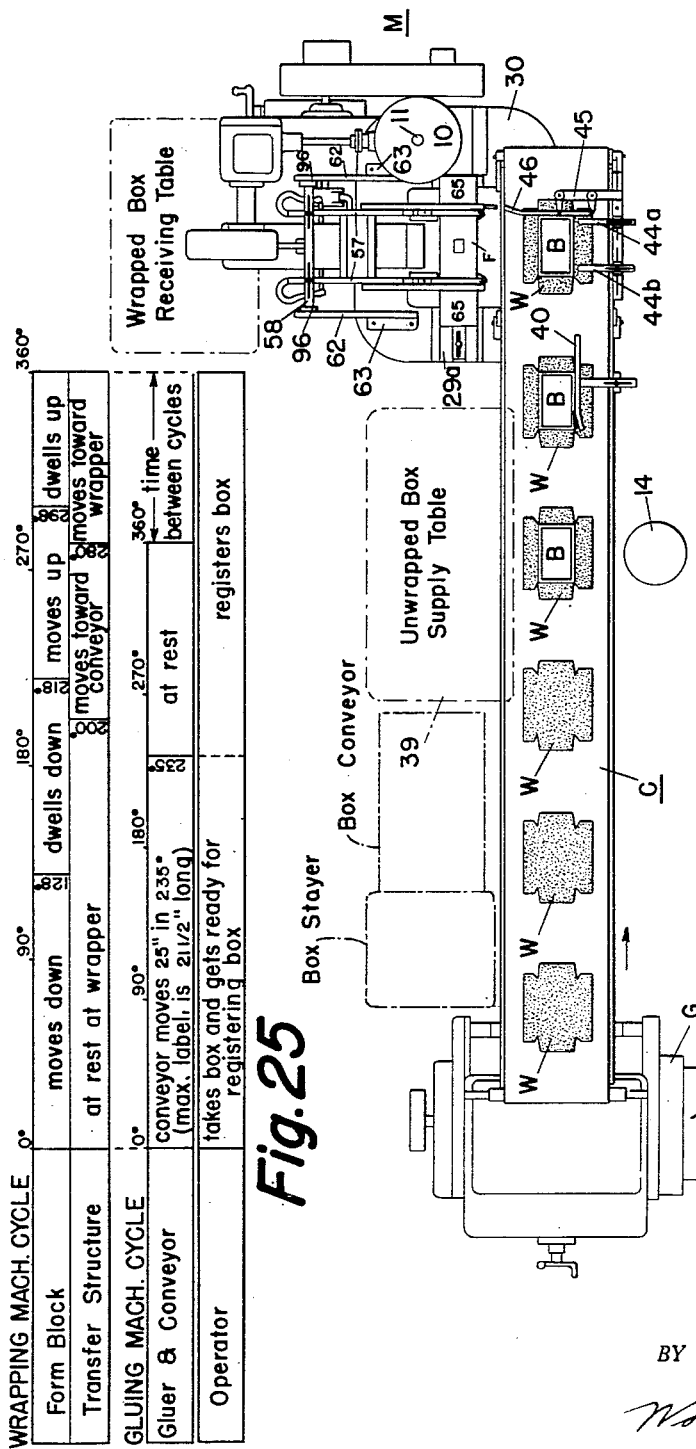

April 12, 1955  L. H. LANGE ET AL  2,705,905
BOX-WRAPPING SYSTEMS
Filed Aug. 28, 1950  11 Sheets-Sheet 4
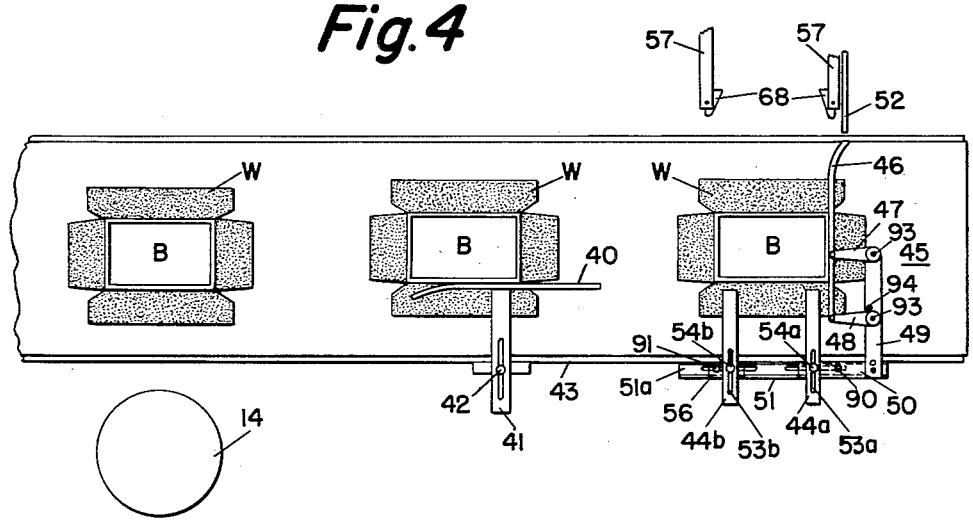
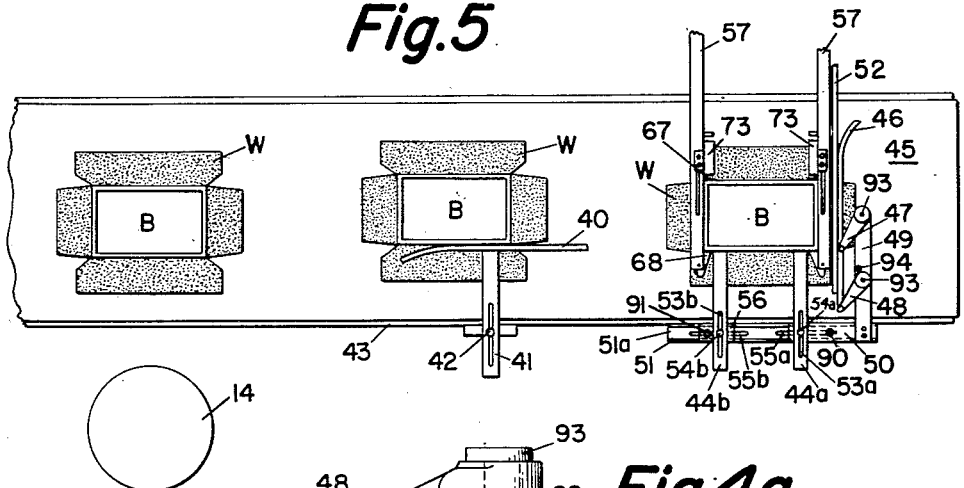
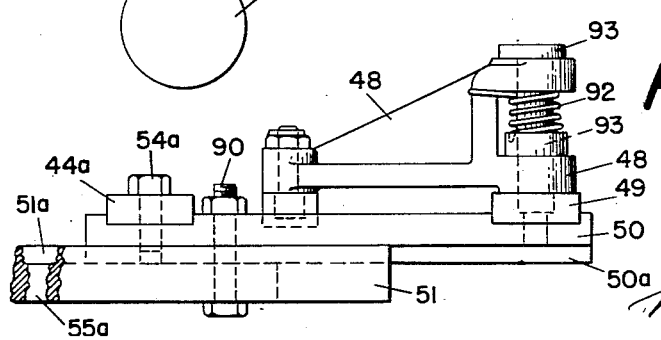
*INVENTORS.*
LUDWIG H. LANGE
WALTER E. FLACK
BY
Woodcock and Phelan
ATTORNEYS

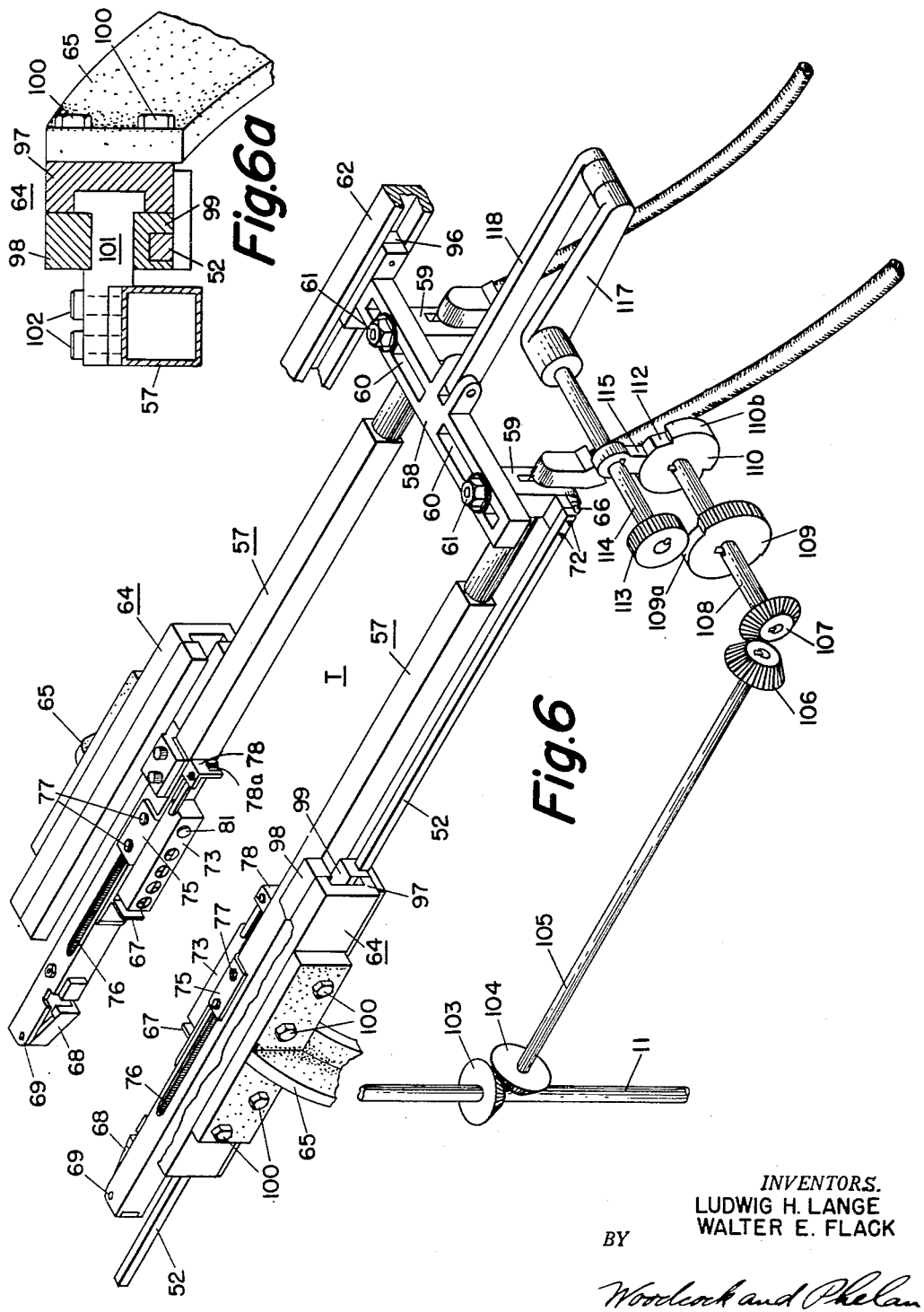

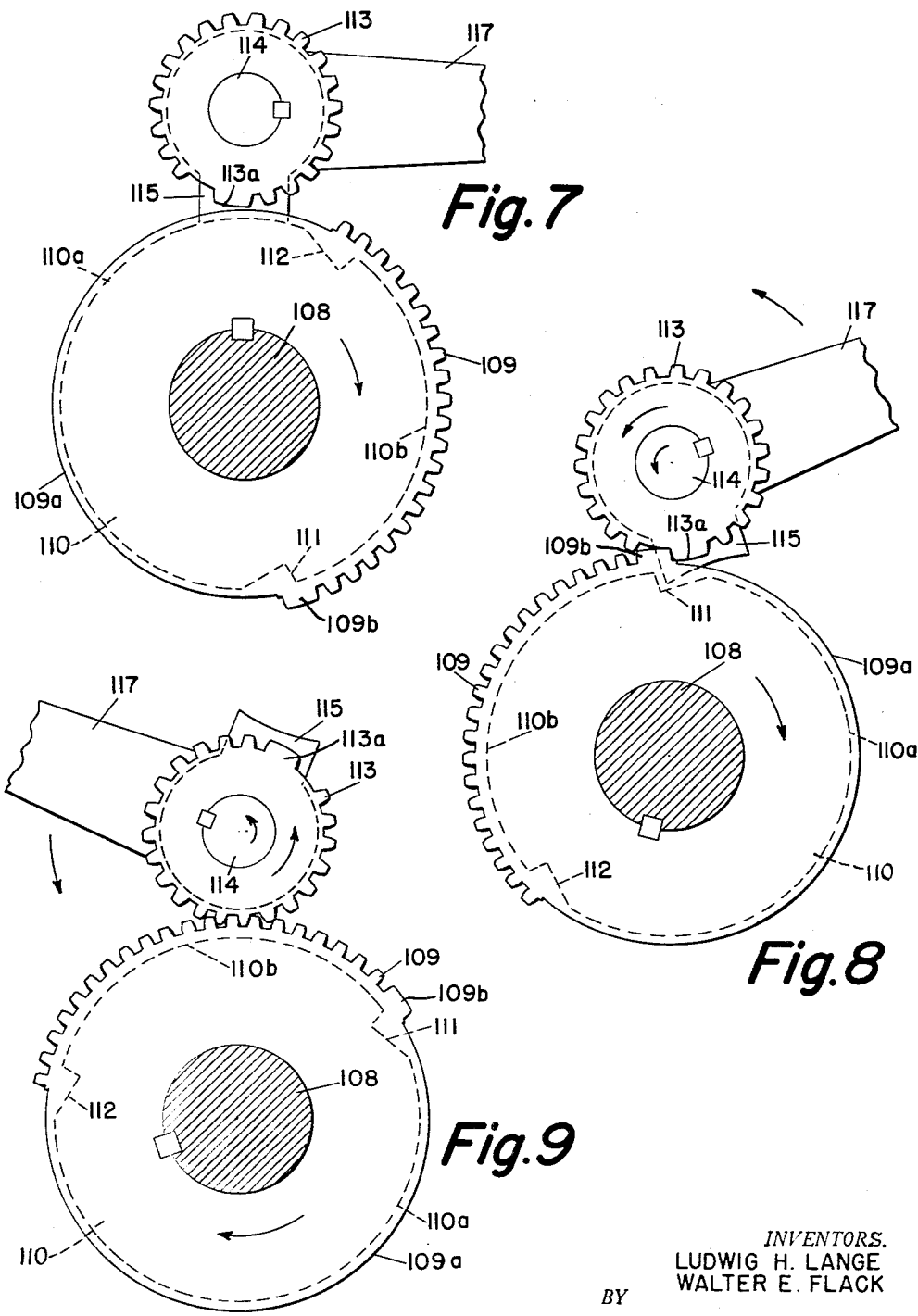

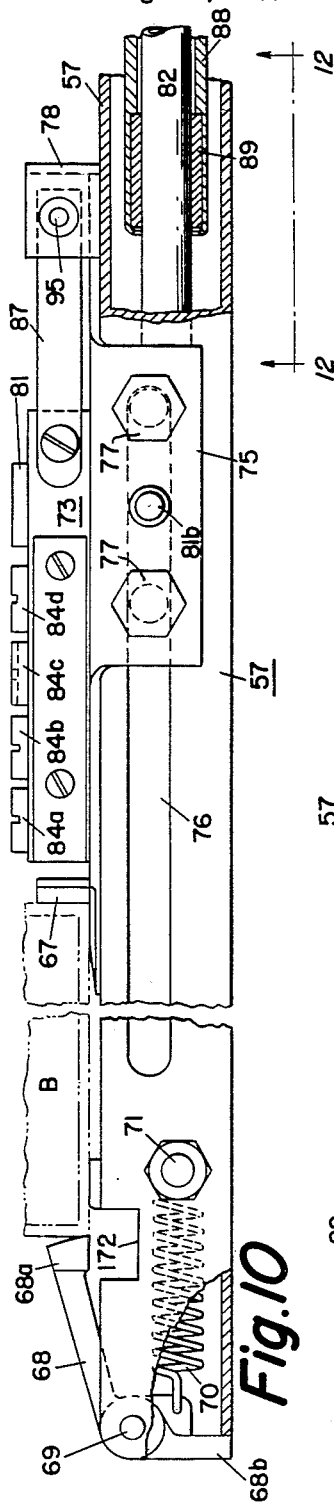
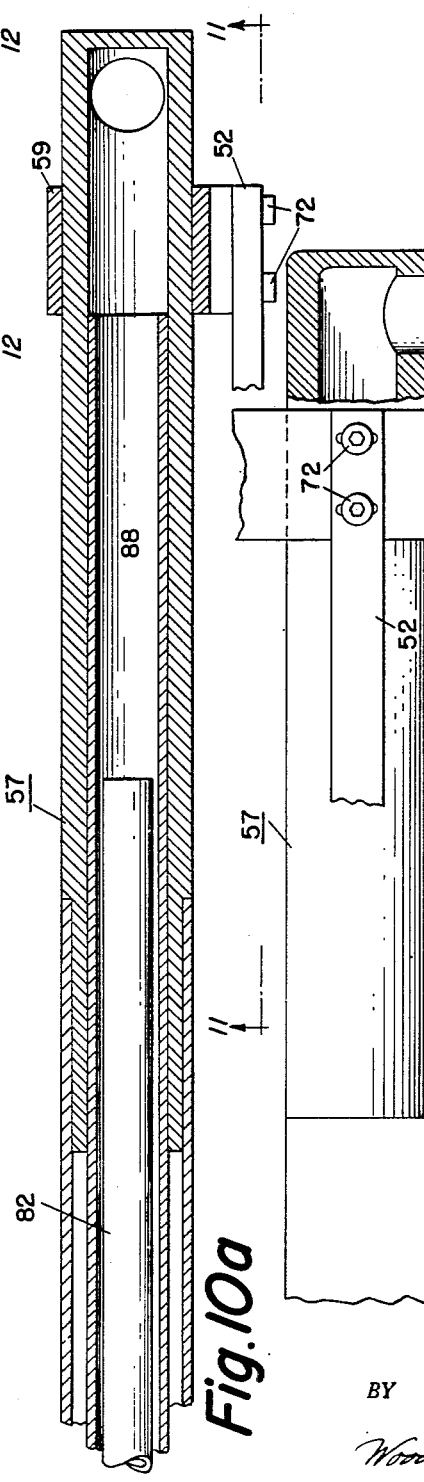
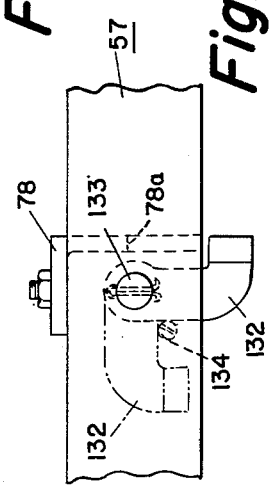

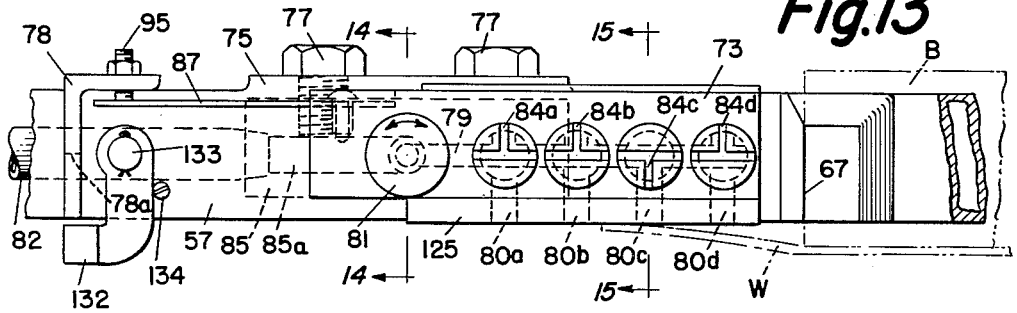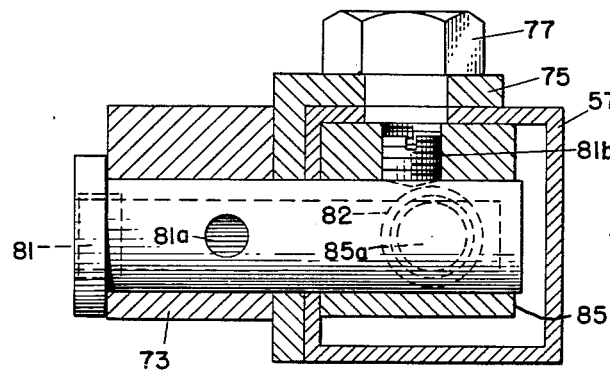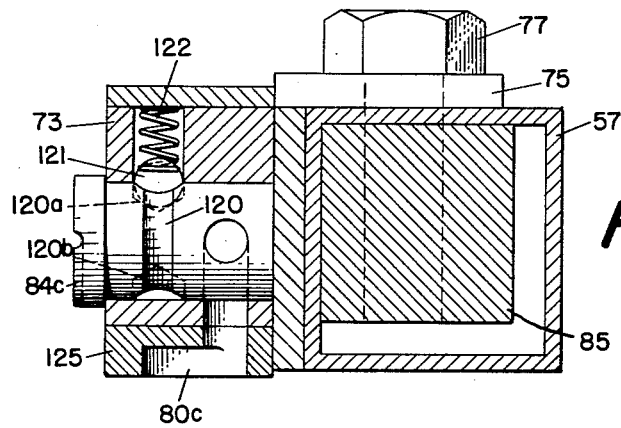

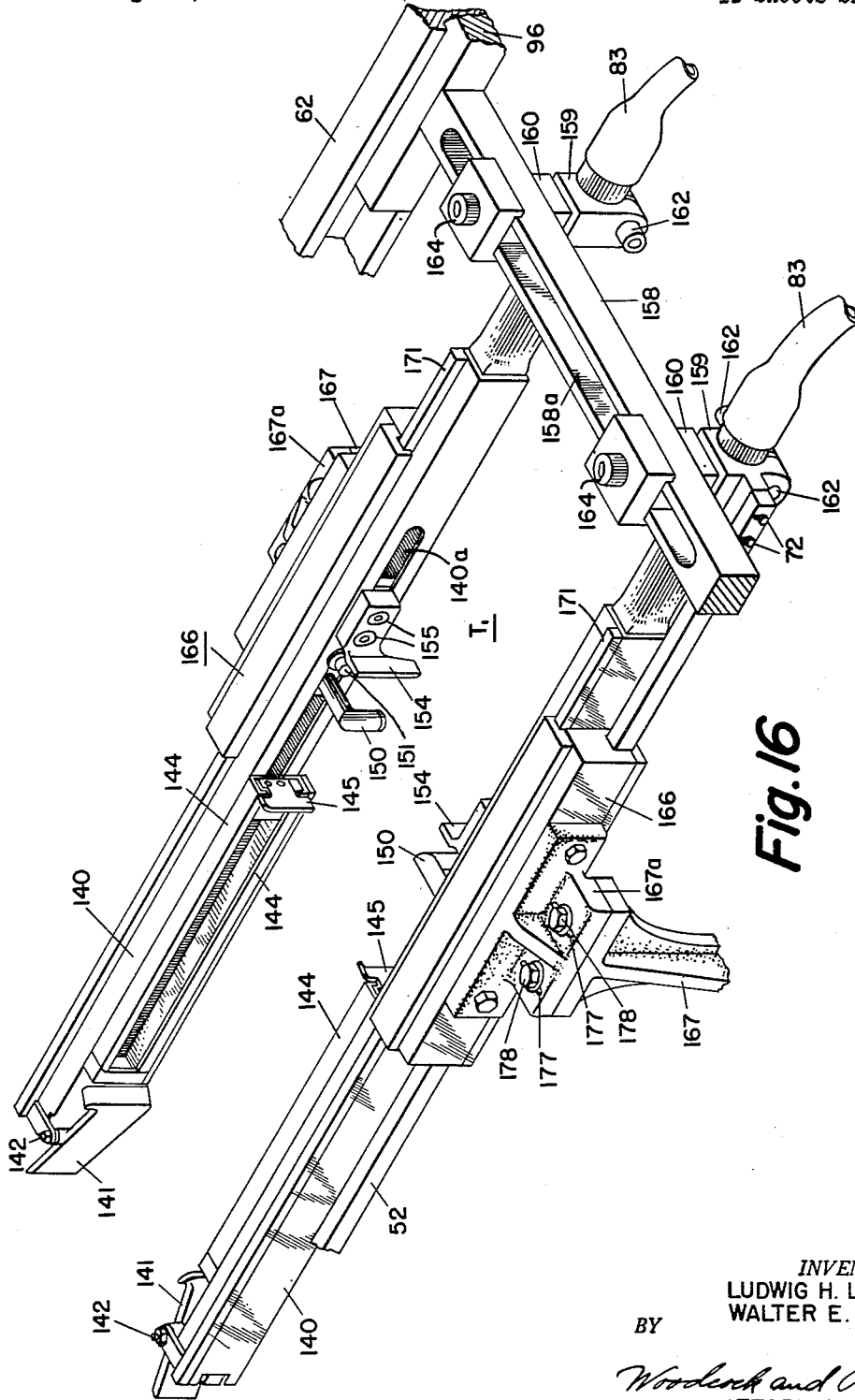

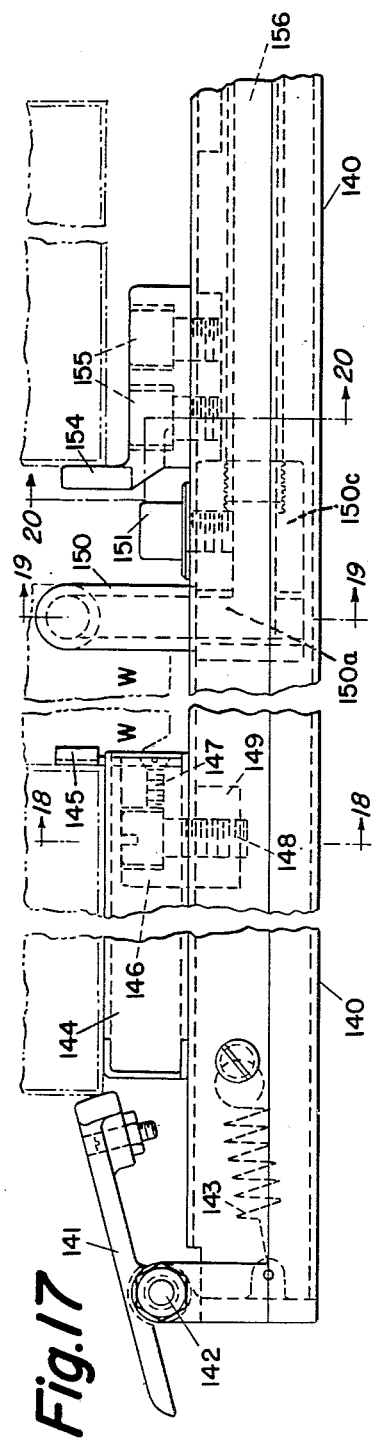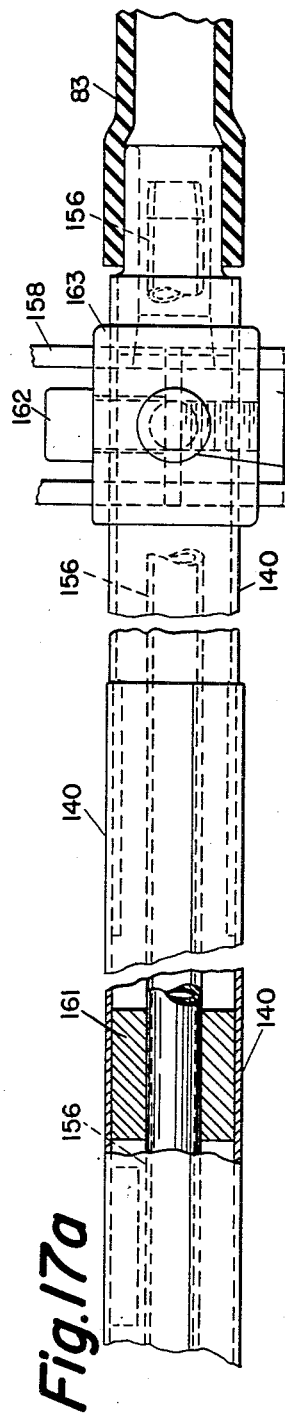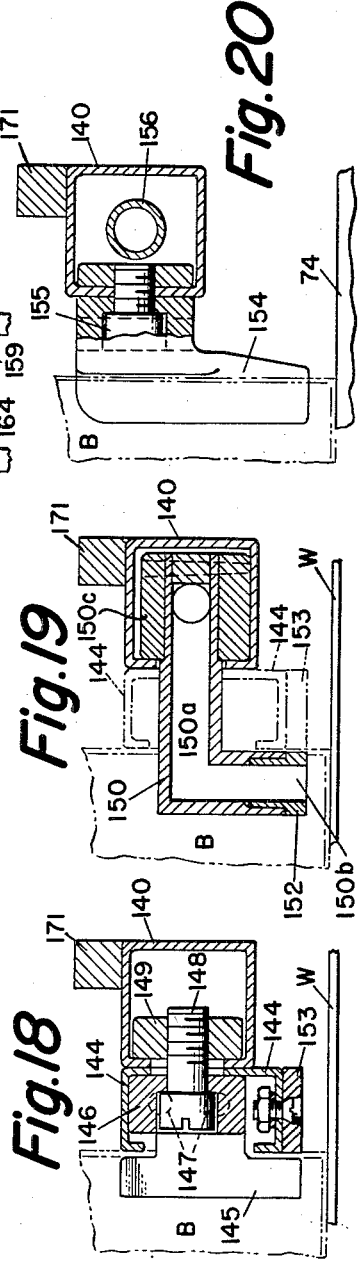

April 12, 1955

L. H. LANGE ET AL 2,705,905

BOX-WRAPPING SYSTEMS

Filed Aug. 28, 1950

*INVENTORS.*
*LUDWIG H. LANGE*
*WALTER E. FLACK*

BY

*Woolerich and Phelan*

ATTORNEYS

United States Patent Office 2,705,905
Patented Apr. 12, 1955

2,705,905

BOX-WRAPPING SYSTEMS

Ludwig H. Lange, Rockledge, and Walter E. Flack, Huntingdon Valley, Pa., assignors to Stokes and Smith Company, Philadelphia, Pa., a corporation of Pennsylvania Application August 28, 1950, Serial No. 181,732

38 Claims. (Cl. 93—54.2)

This invention relates to box-wrapping systems for applying adhesively coated sheet material as wrappers, labels, or the like generically termed "wrappers" to box structures such as set-up boxes and lids to form boxes, box covers, containers, or the like generically termed "boxes."

The present invention is an improvement upon the box-wrapping system of Lange Patent No. 2,144,338 as applied to the application of adhesively coated sheet material to a stayed box. More particularly, the present invention relates to transfer mechanism for automatically pulling an assembly comprising a box and a partially applied wrapper from a transfer station disposed along the path of a wrapper conveyor into the path of the form-block structure of a box-wrapping machine disposed adjacent the transfer station.

Heretofore, it has been the practice in automatic box-wrapping systems to provide a transfer mechanism whose transfer structure is disposed on one side of the wrapper conveyor to push the box assemblies from the conveyor into the path of the form-block structure of a box-wrapping machine disposed on the opposite side of the conveyor. In some systems, the back wall of the box structure is gripped by a single transfer structure and the entire assembly comprising the box structure and partially applied sheet material is lifted from the surface of the conveyor and pushed into the path of the form-block structure of the box-wrapping machine. In other instances, as in the system of the aforementioned Lange patent, two transfer structures which successively engage the box structure are utilized. One of the transfer structures is a carriage which reciprocates between a box-receiving position and a discharge position in the path of the form block, and the other transfer structure is a member which pushes the box structure from an aligning or registering station into the carriage. In the system disclosed by the Lange patent, it is also possible to omit the latter transfer device and to feed the box structure by hand to the carriage. However, such procedure necessitates a reduction in the output of the machine.

While the transfer mechanisms heretofore utilized in automatic box-wrapping systems have operated satisfactorily, nevertheless they have been subject to a number of limitations and have left much to be desired. Foremost among these limitations has been the lack of adjustability in the transfer mechanism for ease in adapting the box-wrapping system to accommodate boxes of different sizes. This feature is of particular importance to the small job-lot box manufacturer whose orders may cover a wide variety of box sizes, and yet each individual order may be for only a few thousand boxes thus requiring frequent change in set-up of the system. By providing, in accordance with this invention, an automatic box-wrapping system that is readily converted for handling first one box size and then another, it is possible for the box manufacturer to fill his orders with low intervening set-up time and so obtains maximum benefit from the automatic equipment.

Another problem that has long been present in the box-wrapping industry is the difficulty encountered in preventing the leading, adhesive coated panel of the box wrapper from curling during the transfer of the box and wrapper assembly from the transfer station of the conveyor into the path of the form-block structure of the box-wrapping machine preparatory to completion of the application of the wrapper to the box structure. Due to the strong tendency of the adhesive on the wrapper to adhere to any object with which it came in contact, it has heretofore been the practice to support the leading panel from the under or non-adhesive surface, or in some cases to apply the leading panel of the wrapper to the respective side of the box structure prior to transferring the box and wrapper assembly from the conveyor into the box-wrapping machine. In either case, the required mechanisms have complicated the box-wrapping system and have prevented the provision of a system which is simple in construction and which is readily adjustable to apply wrappers to box structures covering a wide variety of sizes.

A second problem of equal importance has been the inability to provide a transfer mechanism of simplified construction which leaves the conveyor side of the box-wrapping machine free of power-driven mechanism for the protection of the operator but without necessitating a reduction in the output of the machine. By maintaining the conveyor free from power-driven mechanism, there is provided ready accessibility to the transfer mechanism and wrapping tools of the box machine for ease in adjustment thereof.

A further problem or limitation in the box-wrapping industry has been the difficulty in providing a drive for the transfer structure which affords (a) transfer-structure dwells of proper duration and sequence timed with the movements of the various parts of the box-wrapping system; (b) a relatively long stroke of the transfer structure; and (c) automatic, positive register of the transferred box structure with the form-block structure of the box-wrapping machine.

In accordance with this invention, there is provided a transfer mechanism for automatically and in timed sequence pulling a box and wrapper assembly from a transfer station into the path of the form-block structure of a box-wrapping machine for application of the unapplied panels of the wrapper or sheet material to the corresponding sides of the box structure. More particularly, there is provided transfer mechanism readily adaptable to transporting box structures of various sizes within a wide range of predetermined limits. The transfer structure grips the corners of the box structure adjacent the bottom thereof, thus entailing no adjustment for boxes of different depths, and only requiring adjustment upon change in the length or width dimensions of the boxes.

Further in accordance with the invention, suction devices, carried by the transfer mechanism and adjustable therewith, engage the adhesively coated surface of the leading wrapper panel to prevent curling during transfer of box and wrapper assembly into the path of the form-block structure of the box-wrapping machine. The wrapper-engaging faces of the suction devices or suction heads are of material having the unique characteristic of being non-adherent with respect to the glue on the wrapper.

Also in accordance with the invention, the intermittent reciprocation of the transfer or box-gripping structure of the transfer mechanism in timed relation to movement of the conveyor and of the form-block structure during each cycle of the box-wrapping system is effected by a gear drive; more particularly, the driving means includes a mutilated gear and cam structure rotatable with the gear, driven means including a shaft and pinion carried thereby for engagement with the gear, and a locking pawl rotatable with the pinion and adapted for engagement with the cam. The locking pawl and cam cooperate periodically to lock the driven shaft against rotation to provide dwell intervals of the transfer structure in the cycles of the conveyor and of the box machine. The driven shaft is periodically operatively connected to the transfer structure for reciprocating the transfer structure in such timed relation to reciprocation of the form-block structure to wrap a sheet of material about a box structure by means of the sheet-applying mechanism in the box-wrapping machine during the dwell intervals. The mutilated gear drive, for providing the intermittent reciprocation of the transfer structure, avoids the use of cams which would necessarily be of an impractical size in order to provide a sufficient length of stroke and also avoids any misalignment of the transfer structure at the ends of its stroke with respect to the transfer station or the path of the form block as would result upon wear of a cam surface.

For a more detailed disclosure of the invention and for further objects and advantages thereof, reference may be had to the following description taken in conjunction with the accompanying drawings, in which:

Fig. 2 is a fractional and elevational view, on enlarged scale, taken from the righthand side of Fig. 1;

Fig. 3 is a plan view of the improved box-wrapping system embodying the present invention;

Fig. 4 is a fractional plan view, on enlarged scale, of a portion of the box-wrapping system of Fig. 3;

Fig. 4a is an elevational view, on enlarged scale, of stop structure shown in Fig. 4;

Fig. 5 is a fractional plan view, on enlarged scale, similar to Fig. 4 but with the parts thereof in a different operating position;

Fig. 6 is a perspective view of the improved transfer mechanism of Figs. 1–3;

Fig. 6a is a sectional view, on enlarged scale, of parts shown in Fig. 6;

Figs. 7–9 are fractional elevation views, on enlarged scale, of gear drive mechanism shown in Fig. 6 in different operating positions;

Figs. 10 and 10a are fractional plan views, on enlarged scale and partly in section, of a transfer member shown in Fig. 6;

Fig. 11 is an elevational view partly in section taken along the lines 11—11 of Fig. 10a;

Fig. 12 is an elevational view taken along the lines 12—12 of Fig. 10;

Fig. 13 is an elevational view, on enlarged scale, of an adjustable unit comprising an ejector device, a suction device and a stop member shown in Fig. 6;

Fig. 14 is a sectional view taken along the lines 14—14 of Fig. 13;

Fig. 15 is a sectional view taken along the lines 15—15 of Fig. 13;

Fig. 16 is a view in perspective of a modification of the improved transfer mechanism of Figs. 1–3 and 6;

Figs. 17 and 17a are fractional plan views, on enlarged scale and partly in section, of a transfer member and associated parts shown in Fig. 16;

Fig. 18 is a sectional view taken along the lines 18—18 of Fig. 17;

Fig. 19 is a sectional view taken along the lines 19—19 of Fig. 17;

Fig. 20 is a sectional view taken along the lines 20—20 of Fig. 17;

Fig. 25 is a timing diagram for the various components of the improved box-wrapping system embodying the present invention.

Figure 1:
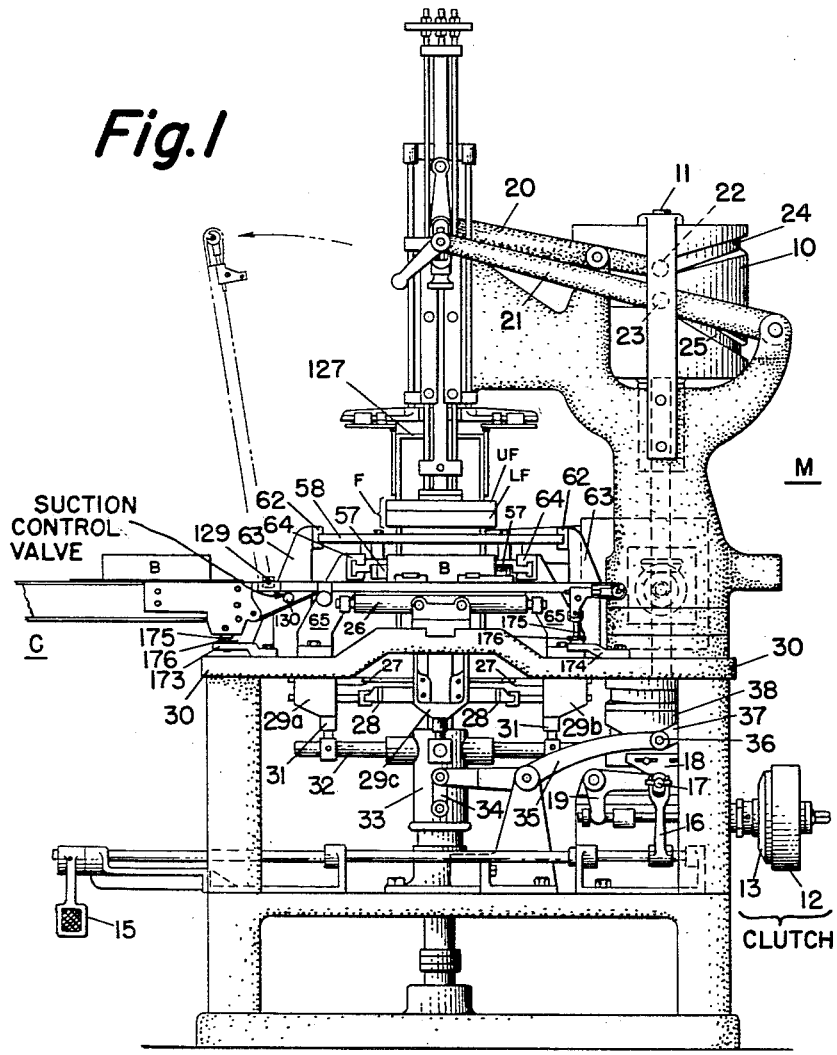
Fig. 1 is a front elevational view of a box-wrapping machine embodying the improved transfer mechanism.

Referring to Figs. 1 to 3 of the drawings, the box machine M is of type shown in U. S. Patents Nos. 2,074,561 and 2,144,338. The main cam 10 is attached to vertical shaft 11 which is driven from a motor, not shown, through a clutch comprising the driving element 12, Fig. 1, and the driven element 13. The operator preferably is located at a position to one side of the machine M as indicated by stool 14, Fig. 3, and at that position registers stayed boxes upon wrappers W transported by the conveyor C from a gluer G to a transfer station adjacent the box machine M. The operation of the gluer G and the conveyor C are synchronized with the operation of the box machine M by means of a cam and link connection (not shown) as fully described and shown in U. S. Patent No. 2,144,764. While the cycles of the box machine M and the gluer G and conveyor C are initiated simultaneously, the gluer G and conveyor C may be operated at a faster rate than the box machine M to provide the operator with additional box registering time as hereinafter to be described in detail (Fig. 25). To initiate operation of the box-wrapping system and specifically the machine M, the operator depresses the pedal 15, Fig. 1, causing the arm 16 to withdraw a pin 17 from engagement with the adjustable cam 18 rotatable with shaft 11. A spring, not shown, is thereupon effective to move the driven clutch element 13 into driving engagement with the driving clutch member 12. At the end of one revolution of shaft 11, which corresponds with one cycle of the wrapping machine, the cam 18, through pin 17, rocks the bellcrank lever 19 in clockwise direction to withdraw the driven clutch member 13 and so interrupt operation of the machine, provided the operator does not hold the pedal 15 depressed, in which event the cycle repeats.

During each cycle of the box-wrapping machine M the main cam 10 makes one complete revolution and the form block F, comprising the upper form UF and the lower form LF, is moved from the position shown in Fig. 1 downwardly in a path adjacent various sheet-applying tools and thence back to its original position shown in Fig. 1. During such movement, the bottom of the box is clamped between the lower form block LF and the platen 74, Fig. 2. The movement of the form block F and relative movements with respect to each other of the form-block components UF and LF are effected by the levers 20 and 21 provided, respectively, with cam followers 22 and 23 which ride in the cam grooves 24 and 25 of the main cam 10. As well understood in the art, the particular form block selected for a run is dimensioned to suit the particular boxes to be wrapped by the machine.

The various sheet-applying tools, including the side rolls 26, Fig. 2, end rolls not shown, marginal turn-in tools 27, Fig. 1, and presser blocks 28, are carried by four tool slides 29a–29d adjustably secured to the table 30 of the machine and each provided with an operating member 31 adjustably secured to a bar 32 extending from a slidable sleeve 33, connected by link 34 to a lever 35 carrying a cam follower 36 received by groove 37 of cam 38 disposed on the lower end of the vertical shaft 11 of the box-wrapping machine M. During each cycle of the machine M, the sleeve 33 is reciprocated to effect the various sheet-applying operations of the tools, all as more fully shown and described in the aforesaid Rider et al. U. S. Patent 2,074,561.

Referring to Fig. 3, the conveyor C is intermittently advanced, making one step for each cycle of the box-wrapping machine M, to transport adjacent to the path of the form-block structure F the assemblies each comprising a stayed box structure B to which is adhesively attached partially applied sheet material such as a wrapper or label W. The conveyor C, preferably of the suction type for holding the wrappers flat on the conveyor by suction, as in Stokes U. S. Patent No. 1,701,317, or in Davis U. S. Patent No. 1,818,198, is arranged to transport the wrappers from a gluing machine G, such as shown in the aforesaid Stokes patent or Federwitz U. S. Patent No. 1,772,344, to the transfer station adjacent the box-wrapping machine M. As aforementioned, an operator is stationed at stool 14 intermediate the gluing machine G and the box-wrapping machine M for manually registering stayed boxes on the adhesively coated wrappers W to form the box assemblies. A supply of stayed boxes to which wrappers are to be applied may be stacked within easy reach of the operator on a supply table indicated by the area 39. Also the stayed boxes may be delivered to the operator directly form the staying machine by means of a separate conveyor in timed relation with conveyor C.

As the adhesively coated wrappers W are fed to the conveyor C by the gluing machine G, they are positioned approximately along the center line of the conveyor C. The wrappers W remain in that position, being held there by suction, as they are intermittently stepped along to the assembly station where a box structure B is applied to each wrapper W by an operator to form an assembly. To assure proper position of the assembly upon its delivery to the transfer station adjacent the form block F, an alignment shoe 40, Figs. 3–5, is adjustably supported horizontally above the surface of the conveyor and intermediate the assembly and transfer stations. The alignment shoe 40 extends parallel to the center line of the conveyor C and is positioned to engage a side wall of the box structure B for positioning the assembly with respect to side stops 44a, 44b at the transfer station, hereinafter to be described in detail, to insure clearance of the stops 44a, 44b by the box structure B upon delivery of the assembly to the transfer station by the conveyor C. The alignment shoe 40 is adjustably supported from one edge of the conveyor frame 43 by means of a slotted rod 41 and a bolt 42, both the shoe 40 and the rod 41 being positioned slightly above the surface of the conveyor belt C to permit the adjacent side-panel of the wrapper (and the wide bottom flange in the case of an extension bottom box) to pass thereunder without obstruction.

Upon arrival of each assembly comprising the box structure B and its partially applied wrapper W at the transfer station adjacent the form block, the leading end of the box structure is engaged by adjustable stop structure 45, Figs. 3–5, the construction of which is novel and forms a part of the invention. The stop structure 45 comprises a movable stop member 46 which is disposed over the surface of the conveyor belt C and against which the leading end of each box structure B moves for bringing each assembly to standstill in predetermined position with respect to the center line of the form block F of the box-wrapping machine M. The stop member 46 extends transversely of the conveyor belt C and is carried by two hinged arms 47 and 48 for parallel motion and which are in turn carried by a support adjustable lengthwise of the conveyor belt C. The adjustable support comprises a rod 49 which extends transversely of the conveyor belt C and is bolted to a block 50 for longitudinal adjustment therewith. The block 50, Fig. 4a, is provided with a tongue 50a adapted to be received by the groove 51a of the member 51 which is mounted on the conveyor frame 43, Figs. 4 and 5, and to the side of the conveyor belt C away from the box-wrapping machine M. The block 50 is bolted to member 51 by means of bolt 90 which extends through a slot 55a in the bottom of groove 51a, thus permitting adjustment of stop structure 45 as a unit lengthwise of the conveyor C.

In order to bias the stop member 46 to a predetermined position perpendicular to the center line of the conveyor C, there is provided a torsional spring 92 surrounding each of the pivot members 93 of arms 47 and 48 and positioned between their bifurcated ends. The lower end of the spring 92, Fig. 4a, is adapted to be held stationary while the upper end thereof engages the pivotal arm 48. The force of the spring 92 tends to rotate the arm 48 in a clockwise direction (Fig. 5); however, the extent of rotation is limited by engagement of arm 48 with stop pin 94, Fig. 4. Upon rotation of the arms 47 and 48 in a counterclockwise direction, as hereinafter will be described, the restoring force of torsional springs 92 will return the arms 47 and 48 to their initial positions with arm 48 in contact with stop pin 94, thus returning stop member 46 to its predetermined position. The end of the stop member 46, Figs. 4 and 5, adjacent the wrapping machine M is curved for engagement by a push rod 52 carried by the transfer structure of the wrapping machine M hereinafter to be described.

Also mounted on the member 51 are the side stops 44a, 44b which are adapted to engage a side of the box structure B of an assembly. The side stop 44a, Figs. 4, 4a and 5, is provided with a slot 53a for adjustable connection to the block 50 by means of a screw 54a to permit adjustment thereof transversely of the conveyor C for the accommodation of box structures and wrappers of different widths. Stop 44a is movable as a unit with block 50 and stop structure 45 lengthwise of slot 55a in the supporting member 51, thus permitting lateral adjustment of the side stop 44a for the accommodation of box structures and wrappers of different lengths. A similar mounting arrangement is provided for the other side stop 44b wherein a screw 54b extends through a slot 53b in side stop 44b for securing the latter to a block 56 which is adjustable lengthwise of the slot 55b in supporting member 51 and is secured thereto by means of a bolt 91, Figs. 4 and 5. As also in the case of the alignment shoe 40 and the end stop 46, the side stops 44a and 44b are mounted slightly above the surface of the conveyor C to permit the projecting panels or unapplied flaps of the wrappers W to pass thereunder without obstruction. By mounting the alignment and stop elements closely adjacent the surface of the conveyor, it is readily possible to accommodate box structures of various depths with no further adjustment being necessary, regardless of whether the box structure be shallow or of considerable depth.

To transfer an assembly BW from the transfer station to a delivery station in the path of the form block F, there is provided a transfer mechanism T comprising transfer members 57, 57 adjustably secured at their rear ends to a carriage member 58 at the rear of the machine by means of clamping blocks 59, 59 (Fig. 6) which are in turn adjustably mounted in slots 60, 60 of the carriage 58 by means of bolts 61, 61. The carriage member 58, Figs. 1–3 and 6, is suitably mounted as by bearing members 96, 96, only one member 96 being shown in Fig. 6 the other member 96 being omitted for purposes of clarity in the drawing, for reciprocation in carriage guides 62, 62 which are supported by means of brackets 63, 63 (Figs. 1-3) secured to table 30 of the box-wrapping machine M. The transfer members 57, 57 are supported for horizontal movement in transfer guides 64, 64 which are in turn supported by brackets 65, 65 (Figs. 1, 3) carried by the lower slides 29a and 29b.

Referring to Figs. 6 and 6a, each of the transfer guides 64 comprises a channel member 97 with a pair of rectangular rods 98 and 99 secured to the channel edges as by screws 100, thus to form a substantially T-shaped channel for receiving the T-shaped bearing block 101 provided on each of the transfer members 57. The T-shaped bearing blocks 101 are secured to the tops of transfer members 57 as by screws 102 and extend to the outer side of the transfer members 57 away from the path of the form block structure F. The lower rod 99, Fig. 6a, is provided with a channel for receiving the push rod 52 which is carried by the corresponding transfer member 57 opposite the end stop structure 45. In this manner the transfer members 57, 57 may be reciprocated freely in their guides 64, 64 without interference with the box assembly gripping structure carried by the transfer members and hereinafter to be described in detail.

The transfer members 57, 57 extend from the carriage 58 at the rear of the machine M and straddle the path of movement of the form block F. Thus upon reciprocation of the carriage 58, the transfer members 57, 57 are caused to reciprocate in unison on the opposite sides of the path of the form block F. During each cycle of the transfer mechanism T, the transfer members 57, 57 move from their dwell position at the path of the form block F, Fig. 2, forward over the conveyor belt and beyond the center line thereof to receive a box assembly at the transfer station as indicated by broken lines in Fig. 2. To clarify the drawing, side stop 44a and end stop structure 45 have been omitted and side stop 44b has been broken away at the box-engaging end, Fig. 2. Upon receiving the box assembly, the transfer members 57, 57 immediately move in reverse direction back to their dwell position, shown in full lines in Fig. 2, for delivery of the box assembly to a second station or delivery station in the path of movement of the form block F.

Thus, each cycle of the transfer mechanism comprises a dwell in the assembly-deliverying position at the path of the form block F followed by continuous movement over to and back from the transfer or assembly-receiving station to return the transfer mechanism to the dwell position for the initiation of a succeeding cycle.

The mechanism for cyclically operating the assembly transfer mechanism in timed relation with the wrapping tools of the box-wrapping machine M is of novel construction and forms a part of this invention. Referring to Fig. 6, vertical shaft 11, which as previously described is driven from a motor, is provided with a miter gear 103 which engages a second miter gear 104 mounted at one end of a connecting shaft 105. At the opposite end of shaft 105 there is provided another miter gear 106 which is adapted to engage the miter gear 107 of shaft 108 which forms the driving shaft of the actuating mechanism. In order to provide an intermittent reciprocating movement to the transfer structure including transfer member 57 and carriage 58, the driving shaft 108 is provided with a mutilated gear 109 having a peripheral portion 109a which is devoid of teeth. Also mounted on shaft 108 and rotatable therewith is a locking cam 110 of uniform diameter. The locking cam 110, Figs. 6–9, has a pair of cam surfaces 110a, 110b separated by recessed portions or notches 111 and 112. In angular extent, the cam surface 110a of locking cam 110 corresponds with the toothless portion of the driving or mutilated gear 109.

A full toothed gear 113 is mounted on a driven shaft 114 for intermittent driving engagement with the mutilated gear 109. A locking member or pawl 115 is also mounted on the driven shaft 114 and operatively connected to the driven gear 113 for rotation therewith. The locking pawl 115 is adapted to engage the surface 110a of locking cam 110 to lock the driven gear 113 against rotation during a predetermined portion of each revolution of the driving or mutilated gear 109 corresponding to the toothless portion 109a of the driving gear 109 so to provide a dwell interval of the transfer structure at the path of the form block, Fig. 7. Upon completion of the dwell interval, Fig. 8, the teeth of the driving gear 109 will engage the teeth of the driven gear 113 and concurrently the notch 111 of cam 110 moves in position to release the pawl 115 so to permit motion of the operating shaft 114 of the assembly-transfer mechanism.

Mounted on driven shaft 114 and at the end thereof remote from driven gear 113, there is provided a crank 117 which is operatively connected, as by link 118, to the carriage 58, Figs. 6 and 2, of the transfer structure T. The crank 117, protected by safety guard 127, is mounted on the driven shaft 114 in such positional relationship with respect to the toothless portion 109a of the mutilated gear 109 that the transfer structure T remains at rest or dwells at the assembly-delivery station during downward movement and dwell of form block F and moves therefrom to the assembly-receiving station and thence, without pause, back to delivery station while the form block F moves upward to its upper dwell position (see Fig. 25).

As shown in Figs. 7–9, the driving gear 109 and the driven gear 113 are each provided with a double tooth 109b and 113a respectively to absorb the shock caused by the initial engagement of the teeth of the two gears (Fig. 8) upon completion of the dwell interval shown in Fig. 7. Heretofore it has been customary to use a cam and follower arrangement for actuating the transfer mechanism, but such an arrangement is impractical when it is necessary to provide for a relatively long length of stroke of the transfer structure. In the present invention, by providing a long transfer stroke, there is avoided the necessity of any automatic machinery on the operator's side of the conveyor as the gripping structure carried by the transfer members 57 moves from the dwell position adjacent the path of movement of the form-block structure F to the transfer station positioned along the center line of the conveyor C to embrace a box assembly thereat without the assistance of any automatic machinery or of an operator and to pull it back to the dwell position. In the box-wrapping system disclosed in the aforementioned Lange Patent 2,144,338, it was not possible to utilize such a long transfer stroke due to the necessity for the suction grippers to grip the under or non-adhesive coated surface of the assembly wrapper W. There the box assembly was not received by the gripping structure of the transfer members at the center line of the conveyor as it was necessary to push the box assembly to the edge of the conveyor toward the path of movement of the form-block structure F, by mechanical means, or in the absence thereof by the operator to permit the leading unapplied panel of the wrapper to extend over the edge of the conveyor for engagement of its under non-adhesively coated surface with the suction grippers of the transfer members.

With an intermittent gear drive for the transfer mechanism, it is possible to provide for an accurate length of stroke of the transfer members 57 and carriage 58, the length of stroke, which is dependent upon the length of the crank arm 117, being fixed for all sizes of boxes to be wrapped. The locking pawl 115 by its cooperation with the locking cam 110 insures accurate register of the box-gripping structure with the form block F at the end of the assembly-delivery stroke of the transfer carriage, thus eliminating need for any additional aligning structure and precluding damaged boxes because of poor register between the transferred assemblies and the form-block structure F.

Referring to Fig. 4, the transfer members 57, 57 are shown in their retracted or dwell positions. The transfer member 57 opposite the end stop 46 is provided with an extension shown in the form of a push rod 52 which extends parallel to the transfer member 57 and is connected thereto at the corresponding clamping block 59, Figs. 6, 10a and 11, by means of screws 72. As the transfer members 57, 57 move forward from the dwell position, Fig. 4, to the assembly-receiving position, Fig. 5, the extension or forward end of rod 52 engages the adjacent end of the end-stop member 46. Due to the pivotal mounting of the stop 46, the rod 52 first engages the end of the stop 46 and then rides along the curved surface of the extension of stop 46, deflecting the stop from the path of the rod 52 and the adjacent transfer member 57 so to permit the transfer structure to embrace a box assembly at the transfer station preparatory to transferring it to the delivery station in the path of the form block F. While it is to be understood that a fixed end-stop could be utilized for positioning boxes of considerable depth, as in that case the stop could be mounted at a height sufficient to permit the transfer member 57 to grip the box; however, by providing a movable end-stop such as structure 45, it is possible to grip shallow boxes as well as deep boxes, i. e., boxes of all depths within the range of the wrapping machine M.

To support a box assembly BW during its transfer from the conveyor C into the path of the form block F of the box-wrapping machine M, the forward ends of the transfer members 57, 57 are provided with gripping structure for frictional engagement with the box structure B and for suctional engagement with the unset adhesive coated surface of the leading unapplied panel or flap of the wrapper W.

The gripping arrangement for supporting the box structure B comprises adjustable stops 67, 67, Figs. 6 and 10, respectively mounted intermediate the ends of each of the transfer members 57, 57 for engaging the forward or front corners of a box structure B. At the forward ends of the transfer members 57, 57 are gripping fingers 68, 68 pivotally mounted, as by pins 69, 69, for engagement with the rear corners of a box structure B. The gripping fingers 68, Fig. 10, are crank-shaped with one section thereof carrying a shoe 68a for engaging the rear box corners and the other section 68b serving as a stop for cooperating with the end of the transfer member 57 to limit the pivotal movement of the finger 68. The stop section 68b is biased against the end of the transfer member 57 by means of a tension spring 70, one end of which is secured to the transfer member 57 as by bolt 71, and the other end of which is connected directly to the stop section 68b. With the fingers 68, 68 biased in this position, each will normally project beyond the inner surface of the corresponding transfer members 57 and into the path of movement of the box structure B from the transfer station of the conveyor C to the delivery station of the box machine M.

On the forward movement of the transfer members 57, 57 from the dwell position, Fig. 4, to the transfer position, Fig. 5, the gripping fingers 68, 68 will engage the end walls of the box structure B and be depressed thereby to a position flush with the inner surface of the transfer members 57, a notch 172, Fig. 10, being provided therein for receiving the shoe portion 68a of the fingers. Upon such engagement of the fingers 68, 68 with the end walls of the box structure B, the rear side wall of the box structure B is forced against the adjustable side stops 44a, 44b at the transfer station. The side stops 44a, 44b have previously been adjusted in accordance with the length and width of the particular box structure so that when the rear wall of the box structure engages the side stops 44a, 44b the center line of the assembly of box structure and partially applied wrapper will coincide with the center line of the conveyor C whose distance from the center line of form block F coincides with the stroke of the transfer carriage. It is necessary to adjust the side stops 44a, 44b with respect to the length of the box structure to provide adequate clearance for the shoes 68a of fingers 68 to engage the rear corners of the box structure. As the transfer members 57, 57 reach the end of their stroke, Fig. 5, the gripper fingers 68 have just passed the end walls of the box structure, thus permitting the fingers 68 under the bias of springs 70 to move out from their depressed position to a position behind the box structure for engagement of the rear corners of the box structure by the shoes 68a, thereby in turn forcing the front corners of the box structure against the front stops 67. In this manner the box structure may be frictionally yet positively gripped between the finger shoes 68a of fingers 68 and the front stops 67 for transfer by the transfer mechanism T from a receiving position accurately fixed with respect to the conveyor for all sizes of boxes to an accurately fixed delivery position.

Included with the gripping structures of the transfer members 57, 57, there is also provided a suction device for suctionally engaging the adhesively coated unapplied leading panel of the box wrapper W. As shown in Figs. 6 and 10, the suction device comprises a suction head 73 carried intermediate the ends of each transfer member 57 and adjacent the front stops 67. The suction heads 73 having ports in their under faces, Fig. 13, are provided for keeping the free or unapplied leading panel of the wrapper out of contact with various parts of the box-wrapping machine, for example, the platen 74, during the transfer of the box assembly to the position shown in Fig. 2 above the platen 74 which is biased to its uppermost position shown as by springs, not shown. As shown in Figs. 6 and 10, the suction heads 73 are carried by brackets 75 which, in turn, are carried by the transfer members 57. Each of the transfer members 57 is provided with a longitudinal slot 76 through which extend bolts 77, Fig. 10, for securing the brackets 75 to the transfer members 57. The bolts 77 threadedly engage a block 85 within each of the transfer members 57. The block 85 is provided with a suction passage 85a later to be described. In this manner the brackets 75 and blocks 85 for the suction heads may be adjusted lengthwise of the transfer members 57 a distance equal to or less than the length of the slot 76 to accommodate box assemblies of different widths.

An ejecting member 78, the purpose of which will be later described, is also carried by each bracket 75 as is also one of the front stops 67. Thus, it will be seen, Figs. 6 and 10, that the suction head 73, the front stop 67 and the ejector member 78 are adjustable as a unit lengthwise of the transfer member 57 upon lengthwise adjustment of the bracket 75.

Referring to Fig. 13, each of the suction heads 73 is provided with an internal cavity or flow channel 79 and a plurality of external suction ports 80a—80d flow-connected thereto for application of suction to the upper adhesively coated surface of the leading wrapper panel. The suction head 73 is mounted for pivotal movement with respect to the transfer member 57 and bracket 75 by means of a hollow pivot pin 81 which extends through the suction head 73 adjacent one end thereof and spaced from its center of mass and into the interior of transfer member 57 and block 85. The pivot pin 81 is locked in position in transfer member 57 by means of a set screw 81b, Fig. 14 and Fig. 10. One end of a leaf spring 87, Figs. 10 and 13, is connected to the pivot end of the suction head 73 and the other end of the spring 87 is adapted for engaging an adjustment screw 95 for biasing the suction head 73 out of the plane of the adhesively coated surface of wrapper W, thereby preventing the suction head 73 from interfering with the conveyor C upon forward movement of the transfer member 57 to the transfer station. Within the interior of each transfer member 57, there is provided an inlet tube 82 which is connected through passage 85a in block 85 to the hollow pivot member 81 and which, in turn, is connected to the suction head 73. Thus, the suction head 73 and the inlet tube 82 are adjustable as a unit along the transfer member 57. A suction supply member 83, Fig. 11, is connected to one end of the tubular transfer member 57 and is movable therewith as a unit. Transfer member 57 is provided with a liner 88, Fig. 10a, one end of which forms an air-tight joint with the interior of the transfer member 57 and the opposite end of which is provided with a bushing 89, Fig. 10, of suitable packing material to form an air-tight joint with the exterior surface of inlet tube 82. Thus, it will be seen that inlet tube 82 is movable in telescoping relation with the transfer member 57 and liner 88 to maintain a continuous path for suction for all positions of adjustment of the suction head 73.

For application of suction only to the external suction port adjacent the leading edge of the wrapper panel, each of the external suction ports 80a—80d is provided with a corresponding shut-off valve 84a—84d, Figs. 10 and 13. The external suction ports may thus be selectively closed so that only the port or opening coinciding with the leading edge of the wrapper is effective to pick up and hold the leading edge so to keep it from curling or otherwise moving to position precluding its proper application during the box-wrapping operation.

Referring to Fig. 13, valves 84a, 84b and 84d have been turned to their closed positions, leaving valve 84c the only one remaining open. With the valves in this position, the suction head is in adjustment suited to accommodate a wrapper for a box of intermediate depth. The suction path may be traced from the suction supply member 83, Fig. 11, through the interior of transfer member 57 and liner 88 to inlet tube 82, Fig. 10a, through inlet tube 82 to passage 85a, Fig. 13, from passage 85a to the interior of pivot member 81, Figs. 13 and 14, and from the interior of pivot member 81 through opening 81a to the internal cavity 79 in suction head 73.

Each of the shut-off valves 84a—84d is provided with a T-shaped flow channel as may be seen by reference to shut-off valve 84c, Fig. 15 and Fig. 13. The position of the flow channels within each valve may readily be seen by the position of the corresponding T-shaped groove in the upper surface of the valve, the groove also serving as a screw-driver slot for ease of adjustment of the valve. With the T-shaped valve channel in its normal or open position, suction may be applied from internal cavity 79, Fig. 13, through the valve to the external suction port. When the valve is inverted, suction may still be applied through the valve; however, no suction will be applied to its corresponding suction port. This may be seen by reference to Fig. 13 wherein suction is being applied to suction port 80c which coincides with the leading edge of wrapper W. The valve 84c is in its normal position, while valves 84a, 84b and 84d have all been inverted. Thus, the suction path may be traced from cavity 79, through valves 84a and 84b, and through valve 84c to its corresponding external suction port 80c. To maintain the valves in the selected position, each valve is provided with a circumferential groove 120, Fig. 15, having a depression 120a, 120b on each side of the valve corresponding with the open or normal and closed or inverted position of the valve and adapted to receive a ball member 121. The ball member 121 is held against the groove 120 by means of a compression spring 122. When the valve is in its normal position as shown in Fig. 15, the ball 121 will be positioned in depression 120a, thus preventing the valve from accidentally being turned during operation of the transfer mechanism T. To turn the valve to the closed or inverted position, a screw driver may be inserted in the T-shaped slot in the head of the valve and the latter rotated until ball 121 drops into the depression 120b, thereby sealing off the suction path to the corresponding suction port.

At least the wrapper-engaging surface 125 of the suction head 73 is of material which does not stick to the unset adhesive on the wrapper panel. Specifically, the ported underface of the suction head may be a layer or coating of a polymer of tetrafluoroethylene, a resin made by polymerizing gaseous tetrafluoroethylene to yield a solid granular polymer marketed under the trade-name "Teflon." This material has the desirable characteristic of having a non-sticky surface as nothing sticks to it with any strength. Its surface is not wettable by water or by any of the ordinary types of glues or adhesives used in applying wrappers to boxes; hence, the "Teflon" face for the suction head does not pick up glue and glue does not adhere to it. This characteristic of "Teflon" or equivalent permits direct contact between the suction head and an adhesively coated surface. As "Teflon" is available in block form and may be easily machined with standard wood-working or metal-working tools, it is to be understood that the entire suction head 73 may be formed of "Teflon" if desired.

The following is a brief summary of the setting-up and operation of the foregoing box wrapping system. A suitable form block structure F is selected corresponding in size to the particular size of box to be wrapped. With the transfer mechanism T in the dwell position adjacent the path of movement of the form block F, the transfer members 57, 57 are adjusted with respect to the form block F. This adjustment may be made by loosening bolts 61, Fig. 6, and the clamping bolts for the lower slides 29a and 29b, Fig. 1 which carry the brackets 65 for the transfer guides 64, 64, for the transfer members 57, 57 and moving the units, including transfer members 57, 57, together or apart a distance corresponding to the length of form block F. As the wrapping tools of the box machine M for the end panels of the box are also carried by the lower slides 29a and 29b, they will be simultaneously adjusted along with the adjustment of the transfer members 57, 57. This is in contrast to prior box machines wherein it was necessary to adjust separately the transfer members and all of the sets of box-wrapping tools. The wrapping tools for the sides of the box are carried by the upper slides 29c and 29d (Fig. 2) and may be adjusted separately. To adjust for the width of form block F, the clamping screws 66 of the split blocks 59, Figs. 6 and 11, are loosened and the transfer members 57, 57 are slid in the blocks to a position such that the gripping shoes 68a of the box-gripping fingers 63 are in engagement with the rear edge of a box structure placed on the form block F, the latter having been lowered to the assembly-delivery station shown in Fig. 2. Thereafter, additional clamping screws 77 are loosened for movement of the sub-assembly comprising the front stop 67, suction head 73 and ejector 78 relative to the front edge of form block F to position front stop 67 for engagement with the front side of the boxes to be wrapped. After the transfer members and their associated parts have been adjusted to the proper position, the various clamping screws or bolts are then tightened to lock the parts in their adjusted positions. The valves 84a—84d of the suction head 73 are selectively opened or closed in relation to the depth of the boxes to be wrapped in accordance with the foregoing description. The side stops 44a and 44b and the end stop structure 45 at the transfer station on conveyor C also are adjusted to accurately position the boxes to be wrapped with respect to the center line of the conveyor C and the center line of the wrapping machine M which, of course, is the axis of the path of movement of the form block F. Unlike prior transfer arrangements, there is no adjustment of the stroke or either terminal position of the transfer carriage or element.

With the various parts of the box-wrapping system adjusted for the particular size of boxes to be wrapped, wrappers W are successively fed, under control of the operator, to the gluing machine G which applies an adhesive coating to their box-engaging faces and delivers them, coated face uppermost, to the conveyor C. Suction is applied to the under surface of the wrappers W through the conveyor belt to hold them flat and in predetermined positions on the conveyor. The wrappers W are intermittently stepped along or advanced by the conveyor C in timed relation with the wrapping machine M; and as a wrapper W arrives at a position opposite the operator at stool 14, a preformed or stayed box B is registered thereon while the conveyor is at rest, the adhesive engagement between the bottom of the box and the corresponding wrapper panel joining them to form an assembly. Thereafter, the box assembly BW comprising the box structure B and the partially applied wrapper W is stepped along by conveyor C, being realigned when necessary by alignment shoe 40 in advance of its arrival at the transfer station adjacent the path of movement of the form block F. The stop structure 45 is so positioned that the end of the box B of an assembly will engage stop member 46 shortly before the conveyor belt completes a step to insure that assembly has been fully advanced to the transfer station. In order that the box assembly may be shifted across the surface of the conveyer belt upon contact of the box B with the end stop 46 and during transfer from the delivery station to the wrapping machine, the conveyor is divided into two sections, a transport section and a discharge section, which are separated by a transverse butterfly valve (not shown), as shown in Stokes Patent 2,425,210, within the suction box of the conveyor for reducing the suction on the wrapper W of the assembly at the discharge or transfer section. The butterfly valve extends across the suction box of conveyor C adjacent the conveyor hinge 129, Fig. 1, and is operable by an external handle 130 so that the operator may suitably regulate the suction applied at the discharge section to a magnitude not hindering the removal of the box assembly yet sufficient to insure its delivery to proper position and to preclude bouncing back upon engagement with the end-stop 46. With the transfer carriage in its dwell or retracted position, the hinge 129 permits the transfer or discharge section of the conveyor to be swung upwardly or rotated in a counterclockwise direction, thus permitting ready access to the transfer mechanism and the wrapping tools of the wrapping machine M for ease in adjustment thereof. This is not possible with prior arrangements in which the transfer mechanism or parts associated therewith are attached to or extend over or beyond the discharge end of the assembly conveyor.

Figure 21:
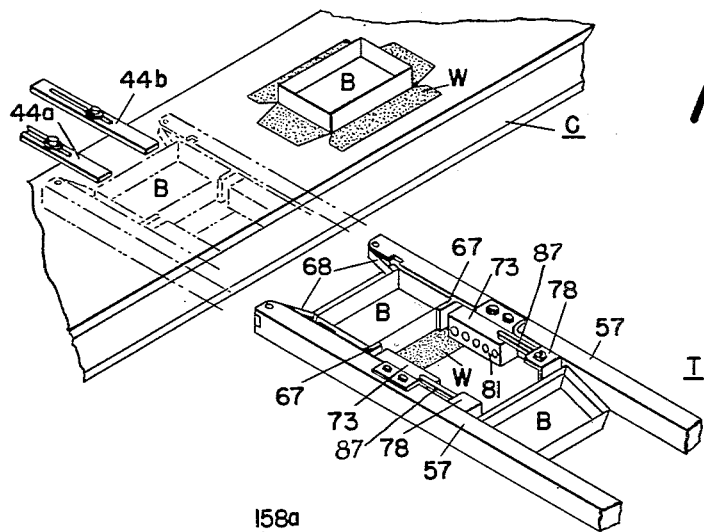
Fig. 21 is a fractional, perspective view of a portion of the box-wrapping system of Fig. 3 illustrating the transfer of a box assembly from a transfer station to a delivery station and the simultaneous ejectment of a completed box.

After engagement of the box assembly with end-stop 46 at the transfer station, Figs. 3 and 4, and while the conveyor is at rest, the transfer mechanism of the machine M is actuated, under the control of the operator, to move the transfer members 57, 57 and their gripping structure from their dwell position at the form block F, Figs. 3 and 4, to the transfer station (Fig. 5 and broken line position Figs. 2 and 21) to embrace the box assembly at the transfer station. Push rod 52 engages the movable end stop 46, deflecting it from the path of its associated transfer member 57, thus permitting the front stops and the gripping fingers to engage the corresponding corners of the box B of the assembly. Concurrently with the gripping of the corners of the box B, the transfer members reach the end of their forward stroke and the suction heads 73, which are pivoted by a pin 81 at one end only and spaced from the center of mass have been biased out of the plane of the wrapper W by springs 87 during the movement of the transfer members 57, 57 to the supply or transfer station, upon arrest of forward movement by their momentum overcome the bias of the springs 87 to pivot downwardly about pins 81, Figs. 6 and 21, and move into engagement with the unset adhesively coated surface of the leading unapplied panel of the assembly wrappers W. As shown in Fig. 13 the suction heads 73 when in their raised position have their center of mass in a plane below the horizontal plane of the pivot 81. The transfer mechanism does not dwell at the transfer station; instead, upon gripping the box assembly it immediately reverses and moves backward to its retracted or dwell position, Figs. 2 and 21, solid line position, to transport an assembly thereto. While the transfer mechanism is in the dwell position, the form block F moves down inside the machine M, taking the box assembly with it, at which time the panels of wrapper W are applied to the corresponding sides of box B in manner known per se. As the transfer mechanism starts to move forward to the transfer station to engage another box assembly, the form block F starts to move up with the preceding wrapper box. As the transfer mechanism moves back from the transfer station with the next box assembly, the form block F has completed its cycle and the completed box has been stripped therefrom and rests upon the platen 74, Fig. 2. Simultaneously with the transfer of the succeeding box assembly into the path of the form block F, the preceding assembly, now completely wrapped, is removed from the platen 74, Figs. 2 and 21, by the ejector device 78 carried by each of the transfer members 57.

For ejecting boxes of shallow depth, there is provided a lower ejecting finger 132, Figs. 12 and 13, pivotally supported by pin 133 directly below each ejecting member 78, the latter having a vertical slot 78a therein, Figs. 6, 12 and 13, to provide clearance for pivotal movement of finger 132. As the ejecting finger 132 hangs below the transfer member 57, it will engage the surface of the conveyor C upon forward movement of the transfer member, but due to its pivotal mounting it may readily be deflected from the plane of the conveyor. As the transfer member moves back from the conveyor, the ejecting finger 132 will drop back into position below the transfer member 57 ready to eject a shallow box. A screw 134 is provided as a stop for the ejecting finger 132 or the screw may be removed and the finger rotated to the broken line position of Fig. 12 and the screw then replaced, thus holding the finger in an inactive position when the regular ejecting member 78 is being used.

As shown in Fig. 2, a discharge chute 135 may be provided at the back of the machine for directing the wrapped boxes to a receiving table where the bottoms and lids of the completed boxes may be assembled, Fig. 3.

Referring to Figs. 16-20, there is shown a modification of the improved transfer mechanism of this invention. The transfer mechanism T₁ comprises a pair of transfer members 140, 140 having box-gripping fingers 141 pivotally supported, as by bolts 142, at their forward ends biased to gripping position by tension springs 143, Fig. 17. Channel members 144 disposed on the inner sides of the transfer members 140 adjacent the gripping fingers 141 provide for adjustment of stops 145. Channel members 144 also serve as spacers for engaging the end walls of the box to maintain them in substantially parallel vertical planes during movement of the box into the path of the form block F. This feature is of particular importance if the end walls of the box have become bowed as is often the case when the supply of set-up boxes is stacked, one within the other, for a length of time before wrapping. If the walls of the box are not in vertical parallel planes, it is difficult to insert the form block therein without damaging the box. The spacers tend to straighten the end walls to their original vertical planes, thus permitting a bowed box to be wrapped as readily as one on which the walls have not been bowed. As shown in Figs. 17 and 18, front stop 145 is secured to a movable block 146 as by screws 147. The block 146 is provided with a mounting bolt 148 and nut 149 for adjustably securing each front stop 145 along the corresponding channel member 144. As shown in Fig. 18, the gap between the spaced channel members 144 permits the front stop 145 to project therefrom and permits ready access to the mounting bolt 148 whose face is slotted or otherwise recessed to receive an appropriate tool. The front stops 145 are adjusted in accordance with the size of boxes to be wrapped in order that the corners of the boxes may be gripped between the corresponding front stops 145 and gripping fingers 141. The channel members 144 on the spaced transfer members 140 engage opposite walls of the box, Fig. 17, and prevent them from becoming bowed as the corners of the box are gripped for transfer of the box assembly from the transfer station to the wrapping machine. Also mounted on transfer members 140 and adjacent the front stops 145 are suction heads 150 for supporting the leading unapplied panel of the wrapper W of the box assembly. The suction heads 150, Figs. 16, 17 and 19, project from the interior of the transfer members 140 through a slot 140a therein and are adjustably secured thereto as by screws 151 which threadedly engage a body portion 150c of suction heads 150. Each suction head 150 is provided with a face 152, Fig. 19, of "Teflon" for engaging the adhesively coated surface of the wrapper panel. The bottom surface of each of the channel members 144 is also preferably provided with a face 153, Fig. 18, of "Teflon" to prevent the adhesively coated end flaps from adhering thereto in the event they curl or otherwise engage the channels 144 during transfer of the box assemblies from the transfer station to the wrapping machine.

Within the interior of each transfer member 140 there is provided an inlet tube 156, Figs. 17 and 17a, which is connected to the suction head 150, both of which are adjustable as a unit in telescoping relation with transfer member 140. A suction supply member such as hose 83 is connected to the rear end of the transfer member 140 and is adjustable therewith. The interior of transfer member 140 is provided with a packing bushing 161 which surrounds the inlet tube 156 and forms an airtight joint therewith. Thus, the path of suction may be traced from suction hose 83 to the interior of the rear end of transfer member 140 through inlet tube 156 and through the internal cavity 150a to the external suction port 150b (Fig. 19) in suction head 150. In front of suction heads 150 are ejector blocks 154, Figs. 16, 17 and 20, which are adjustably mounted on the transfer members 140 as by screws 155 which extend through the slot 140a therein. As may be seen in Figs. 16, 17 and 17a, the channel members 144 do not extend the full length of the transfer members 140, thus there is provided ample clearance between the end walls of the box and the inner surface of transfer members 140, Fig. 17, to prevent any binding between these surfaces during the ejecting operation in the event the end walls of the box are bowed.

Accordingly, it will be seen that on transfer mechanism T₁, Fig. 16, the front stops 145, suction head 150 and ejector block 154 are each separately adjustable whereas on transfer mechanism T, Fig. 6, the front stop 67, suction head 73 and ejector 78 are all adjusted as a single unit or sub-assembly. Each modification has its own advantage. With transfer mechanism T, only one adjustment is necessary to adjust the sub-assembly of front stop, suction head and ejector for boxes of a different width. With transfer mechanism T₁, since each of the parts is separately adjustable, the spacing between each may be varied. This is of particular advantage in wrapping small boxes. The ejector block 154 need not be positioned closely adjacent the suction head 150, thus permitting the finished boxes to be ejected by a long stroke and at a greater velocity since the ejector block will strike the finished boxes relatively early during the return stroke of the transfer mechanism T₁ rather than near the end of the stroke and at a low velocity as would be the case if the ejector block were mounted close to the suction head. Also, the suction heads 150 may be adjusted for accurate alignment with the leading edge of the wrapper regardless of the width of the wrapper panel.

Figure 22:
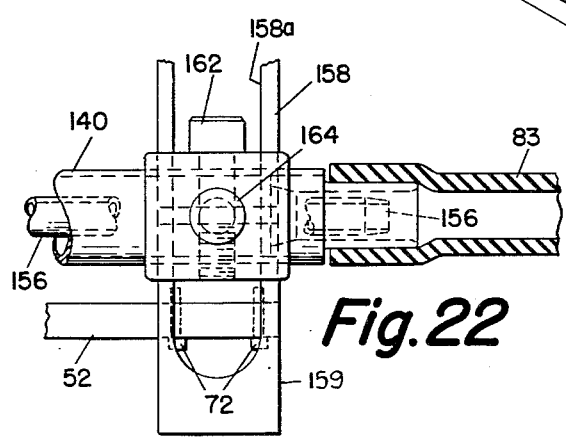
Fig. 22 is a fractional plan view of parts shown in Fig. 16.

As shown in Fig. 16, the transfer members 140 are adjustably secured at their rear ends to a carriage member 158 at the rear of the machine by means of lower clamping blocks 159 which are in turn adjustably secured to the carriage bar 158 by means of the upper clamping blocks 160. By loosening the clamping screws 162, the transfer members 140 may be adjusted lengthwise with respect to the lower clamping blocks 159 to accommodate boxes of different widths. The push rod 52 for engaging the end stop 46 over conveyor C, Fig. 4, is connected to the lower clamping blocks 159, Figs. 22 and 23, by screws 72 for concurrent movement with the transfer members 140 and the carriage 158.

Figure 23:
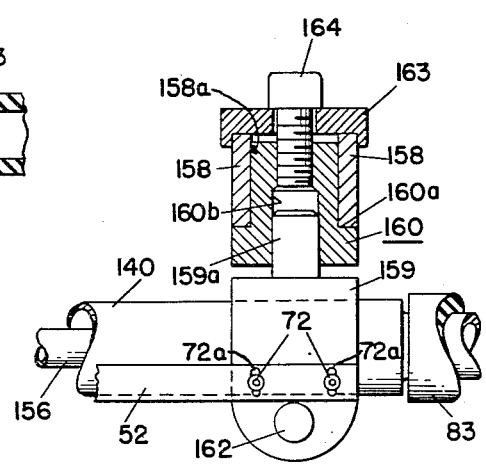
Fig. 23 is an elevational view, partly in section, of parts shown in Fig. 22.

The upper clamping blocks 160, Fig. 23, extend into the slot 158a (Fig. 22) of the carriage bar 158 and are provided with an external shoulder 160a which engages the bottom surface of the carriage bar 158. A clamping plate 163 is adapted for engagement with the upper surface of the carriage bar 158 and is secured to the clamping block 160 by a screw 164, thereby permitting the carriage bar 158 to be clamped therebetween. To connect the upper clamping blocks 160 to the lower clamping blocks 159 for transmitting movement from the carriage 158 to the transfer members 140, the upper clamping block 160 is provided with a socket 160b for slidably receiving a pin 159a of the lower clamping member 159. As shown in Fig. 23, the pin 159a may move vertically within socket 160b, thereby permitting relative movement of the transfer members 140 within their guides 166 in a direction transverse to their reciprocating movement for preventing the transfer members 140 from binding in their guides 166, due to any slide misalignment. To permit a similar freedom of vertical movement, push rod 52 may be provided with vertical slots 72a therein for receiving clamping screws 72 as shown in Fig. 23.

Figure 24:
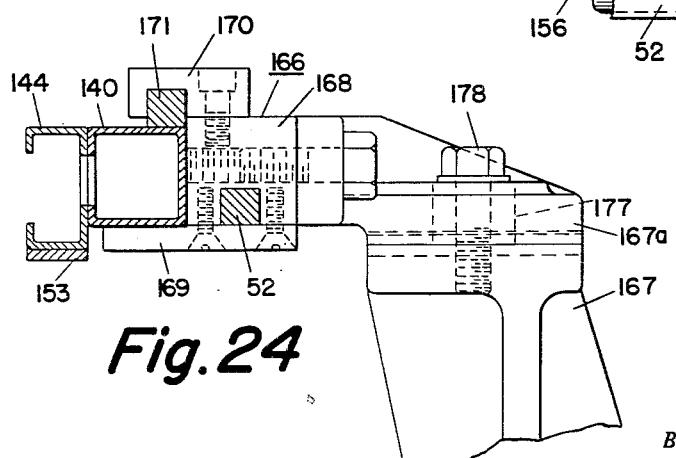
Fig. 24 is an elevational view, partly in section, on enlarged scale, of transfer guides shown in Fig. 16.

The carriage bar 158, Fig. 16, is suitably mounted, as by bearing members 96, only one being shown the one for the opposite end of bar 158 being omitted for purposes of clarity in the drawing, for reciprocation in carriage guides 62, the latter being adapted for support by means of brackets 63 secured to table 30 of machine M similar to the modification shown in Fig. 2. The transfer guides 166 which support the transfer members 140 for horizontal movement are in turn supported by brackets 167, carried by the lower slides 29a and 29b of the machine M similar to the modification shown in Figs. 1 and 3. Lateral adjustment of the transfer member 140 to accommodate boxes of different length may be made in a manner similar to that previously described in connection with transfer mechanism T shown in Fig. 6. Brackets 167 may be provided with an adjustable portion 167a having slots 177 to receive screws 178 to permit slight transverse adjustment of transfer members 140 to accommodate boxes constructed from various thicknesses of material. The transfer guides 166, Fig. 24, comprise a mounting block 168 secured to the bracket 167 and a bearing plate 169 secured to the bottom and extending to one side thereof for supporting the transfer member 140. The lower portion of the block 168 is provided with a channel for receiving the push rod 52 and a gib 170 is secured to the top of block 168 for engaging a rectangular rod 171 carried by the transfer member 140, thereby preventing lateral movement of the transfer member 140 within its guide 166.

Figure 1A:
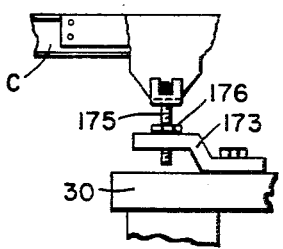
Fig. 1a is a fractional view, on enlarged scale, of the elevation adjusting mechanism for the discharge section of the conveyor shown in Fig. 1.

As shown in Figs. 16 and 17, the suction heads 150 and ejectors 154 are mounted for movement in a fixed horizontal plane with transfer members 140 over the surface of the discharge section of the conveyor, and are not pivotally mounted as are suction heads 73 and ejector fingers 132 of transfer mechanism T, Figs. 6 and 12. To insure that the wrapper W will be in the proper horizontal plane for engagement by the suction head 150, there is provided means for displacing the plane of the discharge section of the conveyor C to a plane of different elevation and substantially parallel to the plane of the transfer members 140. The discharge section of the conveyor C is adjustably supported from the table 30 of the wrapping machine M, Fig. 1, as by brackets 173 and 174, each of which is provided with a suitable adjusting screw 175 and nut 176, Figs. 1 and 1a, for adjusting the elevation of the plane of the discharge section to provide a slight clearance between the adhesive surface of the wrappers W and the "Teflon" face of the suction heads as the transfer members 140 move forward in a horizontal plane over the discharge section of the conveyor C to the transfer station. The normal clearance between the transfer members 140 and the surface of the conveyor is in the order of 3/16 inch. As wrappers made from certain types of paper when coated with adhesive have a tendency to curl when only the reduced suction is applied through the conveyor belt, it may be necessary to increase the amount of clearance to more than 3/16 inch to permit the suction heads to pass over the wrapper in avoidance of striking the edge of the latter and tearing or otherwise damaging it.

It is to be understood that either of the transfer mechanisms T or T1 (shown in Figs. 6 and 16) may be used on the box-wrapping machine M of Figs. 1 and 2 and in the complete system as shown in Fig. 3. Accordingly, the elevational adjustment for the discharge section of the conveyor C is also available for use with the transfer mechanism T, Fig. 6, having the pivotally mounted suction heads 73.

In a commercial embodiment of the improved transfer mechanisms shown herein, the box-wrapping machine was capable of wrapping boxes at the rate of forty per minute. The system was adjustable to accommodate boxes as small as 3¼" x 1⅜" x 5/16" and as large as 15" x 10" x 2¾". The conveyor was adjusted to move intermittently in steps of 25" with a maximum length of wrapper or label in the order of 21½".

Referring to the timing diagram of Fig. 25, it will be seen that while the cycles of the box-wrapping machine and the gluing machine are initiated simultaneously, the gluing machine cycle is completed before the completion of the wrapping machine cycle. This results from the faster rate of operation of the gluer and its associated conveyor. The purpose of the difference in rate of operation between the wrapping machine and the gluer is to provide as long a period as possible for the operator to register a box on the adhesively coated wrapper which is being intermittently stepped along by the conveyor. In order for the conveyor to accommodate a wrapper of 21½" in length, it is necessary that the conveyor advance a distance of approximately 25". In this manner the wrappers will be spaced along the conveyor with approximately 3½" therebetween. Such spacing is desirable to prevent adjacent wrappers from coming into contact with each other and to provide sufficient freedom for the operator during the box-registering operation. In one embodiment of the invention, the conveyor advanced the distance of 25" during 235° of the gluing machine cycle, the remaining 125° of the cycle the conveyor was at rest, Fig. 25. Suppose that it is desired to operate the wrapping machine at a rate of 35 boxes/min.; this allows approximately 1.7 sec. for the wrapping machine to wrap one box, i. e., to complete one cycle. If the wrapping machine and the conveyor both operated at the same rate, the 125° registering time would be approximately 0.59 sec. Such a period is not sufficient for an operator to conveniently register a box on a wrapper. In order to provide additional time for the registering operation, the rate of operation of the gluing machine may be increased to provide a time interval between the end of the gluing machine cycle and the end of the wrapping machine cycle. For example, suppose the gluer and its associated conveyor be operated at 45 cycles/min., i. e., approximately 1.3 sec. per cycle (Fig. 25), the 125° registering time will then be approximately 0.45 sec. However, the gluing machine cycle is completed when the wrapping cycle has progressed only 280°, i. e., 0.40 sec. before the completion of the wrapping cycle. Thus, the total time for registering the box will be increased to 0.85 sec. While it is desirable to have as long a registering period as possible, nevertheless this period is sufficient for an operator to conveniently register a box on a wrapper.

The invention may also be applied to machines for wrapping boxes of larger dimensions. For example, the wrappers may be of such a length as to require a 30" movement of the conveyor. In such case with the gluing machine operating at 45 cycles/min., the conveyor will move for a greater portion of its cycle, thus reducing the registering portion of the cycle, for example, to 80° or approximately 0.28 sec. With a wrapping cycle of 30 boxes/min., the total time for wrapping each box will be 2 seconds. As the total time for each cycle of the gluing machine is but 1.3 seconds, there will be a 0.7 sec. interval between the ends of the two cycles. Thus, the total time for registering each box will be equal to the sum of the 80° portion of the gluing machine cycle (i. e. 0.28 sec.) plus the time between the ends of the two cycles (0.7 sec.), giving a total of 0.98 sec.

While certain combination of rates of operation for the box-wrapping machine and the gluer and conveyor have been described, it is to be understood that other combinations may be utilized depending upon the number of boxes to be wrapped per minute, the length of the wrapper to be applied to the box and the desired registering time for the operator.

While preferred embodiments of this invention have been described and illustrated, it shall be understood that the invention is not limited to the specific arrangements shown, and that changes and modifications may be made within the scope of the appended claims.

What is claimed is:

1. In a box machine having reciprocating form-block structure and reciprocating member for moving an assembly of box structure and partially applied sheet material into the path of the form-block structure, suction means for engaging the unset adhesively coated surface of the leading unapplied panel of said sheet material for support thereof during said movement of the assembly by said reciprocating member, the engaging surface of said suction means being of material having the characteristic of being unwettable by the unset adhesive, such as a polymer of tetrafluoroethylene.

2. A machine comprising a conveyor for transporting box structure to a transfer station, stop structure for arresting two adjacent side walls of a box structure at said transfer station, and means for pulling box structure from said transfer station to a delivery station comprising transfer members reciprocating in unison on opposite sides of the delivery station, the forward ends of said members moving over said transfer station to cooperate with said stop structure for embracing a box structure in its arrested position at said transfer station.

3. A system comprising a conveyor for transporting assemblies of box structure and partially applied sheet material to a transfer station, movable stop structure disposed at the transfer station for arresting the box assemblies by engaging the box structure during transport by said conveyor while permitting a flap of the partially applied sheet material to project thereunder, transfer mechanism adapted to remove a box structure and its partially applied sheet material from said transfer station for movement thereof to another station, and a member carried by said transfer mechanism engagable with said movable stop structure to move said stoop structure out of engagement with the box structure to permit engagement of the box structure and partially applied sheet material by said transfer mechanism.

4. A system comprising a conveyor belt for transporting box structure to a transfer station, movable stop structure disposed at said transfer station for engaging a box structure to prevent further movement thereof by said conveyor belt, transfer mechanism adapted to remove a box structure from said transfer station for movement of the box structure to another station, and a member carried by said transfer mechanism and engagable with said movable stop structure to move said stop structure out of engagement with the box structure prior to engagement of the box structure by said transfer mechanism.

5. In a box-wrapping system having a conveyor for transporting assemblies of box structure and partially applied adhesively coated sheet material to a transfer station thereon and a wrapping machine having reciprocating form-block structure adjacent the transfer station, transfer mechanism for moving an assembly of box structure and partially applied sheet material from the transfer station into the path of the form-block structure comprising members reciprocating in unison on opposite sides of the path of the form-block structure, box-gripping structure carried by each of said members for gripping the opposite corners of a box structure, and suction means carried by each of said members for engagement with the unset adhesively coated forward unapplied flap of the sheet material for support thereof during the transfer of the assembly of box structure and partially applied sheet material from the transfer station into the path of movement of the reciprocating form-block structure, the flap engaging surface of said suction means being of material having the characteristic of being unwettable by the unset adhesive, such as a polymer of tetrafluoroethylene, said box-gripping structure and said suction means being disposed for movement in a plane parallel to and above the transfer station.

6. In a box-wrapping system having a conveyor for transporting assemblies of box structure and partially applied adhesively coated sheet material to a transfer station thereon and a wrapping machine having reciprocating form-block structure adjacent the transfer station, transfer mechanism for moving the assembly of box structure and partially applied sheet material from the transfer station into the path of the form-block structure comprising members reciprocating in unison on opposite sides of the path of the form-block structure, box-gripping structure carried by each of said members for gripping the opposite corners of a box structure in avoidance of bowing the walls thereof, suction means carried by each of said members for engagement with the unset adhesively coated forward unapplied flap of the sheet material for support thereof during the transfer of the assembly of box structure and partially applied sheet material from the transfer station into the path of movement of the reciprocating form-block structure, the flap engaging surface of said suction means being of material having the characteristic of being unwettable by the unset adhesive, such as a polymer of tetrafluoroethylene, said box-gripping structure and said suction means being carried for movement in a plane above and parallel to the transfer station, and ejecting means carried by said members and movable therewith for ejecting a box assembly from the path of the form-block structure simultaneously with transfer of another box assembly into the path of the form-block structure.

7. In a box machine including reciprocating form-block structure, the combination of means for pulling box structure into the path of the form-block structure, comprising spaced members reciprocating in unison on opposite sides of the path of the form-block structure and free of any interconnecting structure which crosses said path or which obstructs the space between the forward ends of said members and said path, stop structure carried by each said reciprocating member intermediate the ends thereof, a spring biased box-gripping finger pivotally supported at the forward end of each said member for cooperation with said stop structure to hold a box therebetween in avoidance of bowing the box walls for movement into the path of the form-block structure, and ejecting structure carried by each said reciprocating member for ejecting a box structure from the path of the form-block structure during the movement of a succeeding box structure into the path thereof.

8. The combination set forth in claim 7 wherein said ejecting structure extends below the plane of movement of said reciprocating members to eject boxes of shallow depth, said ejecting structure being pivotally mounted to permit rotation thereof in one direction during the forward stroke of said reciprocating members, and stop means for preventing rotation of said ejecting structure in the opposite direction during the ejecting stroke of said reciprocating members.

9. A transfer mechanism reciprocable between two stations for transferring box structures from one station to the other comprising a carriage supported in line with and behind said stations for movement toward and away from said stations, means for intermittently reciprocating said carriage a fixed length of stroke toward and away from said stations, a pair of rodlike members supported from said carriage and in spaced relation with each other with the forward ends thereof presented for reciprocation from one to the other of said stations, box-gripping fingers carried at the forward end of each of said rodlike members and stop structure disposed intermediate the ends of each said rodlike member for cooperation with said box-gripping fingers in gripping and supporting a box structure therebetween, and means for adjusting within predetermined limits the spacing between said box-gripping fingers and said stop structure to accommodate box structures of various dimensions within said predetermined limits for accurate transfer thereof from the one station to the other without varying said fixed stroke of said carriage.

10. A transfer mechanism reciprocable between two stations for transferring box structure from one station to a second station comprising a carriage supported in line with and behind said stations for movement toward and away from said stations, means for intermittently reciprocating said carriage a fixed length of stroke toward and away from said stations, a pair of rodlike members supported from said carriage and in spaced relation with each other with the forward ends thereof presented for reciprocation from one to the other of said stations, yieldable box-gripping fingers carried at the forward ends of each said rodlike member and stop structure disposed intermediate the ends of each said rodlike member for supporting a box structure therebetween, means for adjusting within predetermined limits the spacing between said box-gripping member and said stop structure to accommodate box structure of various dimensions within said predetermined limits for accurate transfer thereof from the one station to the other without varying said fixed stroke of said carriage, and ejecting structure supported by each said rodlike member adjacent each said stop structure for ejecting a box structure from said second station upon delivery of another box structure to said second station from said first-named station.

11. A transfer mechanism for transferring assemblies of box structure and partially applied sheet material from one station to a second station comprising a carriage supported in line with and behind said stations for movement toward and away from said stations, means for intermittently reciprocating said carriage toward and away from said stations, spaced bars connected at their rear ends to said carriage for movement therewith, the forward ends of said bars being presented for reciprocation from one to the other of said stations, spaced guide means for supporting the overhanging portion of each of said bars, a yieldable finger carried at the forward end of each said bar and stop structure spaced along each said bar for gripping the corners of a box structure therebetween, a suction device carried by each said bar for engaging the leading unapplied panel of the partially applied sheet material of a box assembly, and ejecting means carried by each said bar and disposed between the rear end of said bar and said suction device for ejecting a previously delivered box assembly from said second station upon delivery of a succeeding box assembly to said second station from said first-named station.

12. In a system having a conveyor for transporting box structure to a transfer station thereon adjacent a delivery station, the combination of means for receiving a box structure at the transfer station and for pulling the box structure to the delivery station comprising spaced parallel members reciprocating in unison on opposite sides of the delivery station with their forward ends presented toward the transfer station, guides for supporting said reciprocating members for horizontal movement thereof relative to and over the surface of the conveyor at the transfer station, stop structure carried by each of said members and disposed intermediate the ends thereof for engagement with the forward corners of the box structure disposed at the transfer station, box-gripping fingers pivotally supported at the forward ends of said members to engage the backward corners of the box structure, and means for biasing said box-gripping fingers to grip the corners of a box structure disposed between said stop structure and said box-gripping fingers in avoidance of bowing the box walls to pull the box structure from the transfer station to the delivery station upon reciprocation of said members.

13. In a box machine having reciprocating form-block structure and a conveyor extending adjacent the box machine for transporting an assembly comprising box structure and partially applied sheet material to a transfer station adjacent the path of movement of the form-block structure, the combination of stop structure disposed at the transfer station for engagement with the box structure of a box assembly for arresting movement of a box assembly by the conveyor at the transfer station, means for feeding a box assembly into the path of the form-block structure comprising box-feeding members reciprocating in unison on opposite sides of the path of the form-block structure with their forward ends presented toward the transfer station, an extension carried by one of said members and engageable with said stop structure for deflecting it from the path of said one member, stop structure carried by said box-feeding members for engagement with the forward corners of a box structure, and spring biased box-gripping fingers pivotally supported at the forward ends of said box-feeding members for engagement with the backward corners of a box structure to hold the forward corners thereof against the stops on said box-feeding members for supporting a box structure during its movement from the transfer station into the path of the form-block structure.

14. In a system including a conveyor for transporting assemblies of box structure and partially applied sheet material, a box-wrapping machine having reciprocating form-block structure disposed adjacent the conveyor and a transfer station disposed along the center line of the conveyor and adjacent the path of movement of the form-block structure, means for aligning a box assembly with respect to the center line of the conveyor, movable stop structure disposed at the transfer station and perpendicular to the center line of the conveyor for aligning a box assembly with the path of movement of the form-block structure, a carriage reciprocable toward and away from the center line of the conveyor and the path of the form-block structure, mechanism for reciprocating said carriage and having a fixed length of stroke, said stroke being equal to the distance between the center line of the conveyor and the axis of the path of movement of the form-block structure, transfer members carried by said carriage extending over the center line of the conveyor for pulling box assemblies from the transfer station into the path of the form-block structure, gripping means carried by said transfer members for gripping the corners of a box structure and the leading unapplied panel of sheet material of a box assembly during the transfer thereof from said transfer station to the path of the form-block structure, and means for adjusting said gripping means within predetermined limits relative to the center line of the conveyor and the axis of the path of the form-block structure to accommodate boxes of all sizes within said predetermined limits.

15. A transfer mechanism for transferring box structure from one station to another comprising spaced transfer members reciprocating in unison on opposite sides of the path of movement of box structure between the stations and free of any interconnecting structure which crosses said path, stop structure carried intermediate the ends of each said transfer member for engagement with the forward corners of a box structure, and yieldable structure supported at the forward end of each said transfer member and extending slightly into said path, said yieldable structure being adapted to yield from said path upon forward movement of said transfer mechanism and at the limit of said forward movement to press against the rear corners of a box structure to force the forward corners of the box structure against said stop structure on said transfer members, thereby gripping the box structure for movement from said one station to said other station.

16. In a box-wrapping machine a transfer mechanism reciprocable between two stations for transferring assemblies of box structure and its partially applied wrapper from one station to a second station comprising a pair of spaced transfer members, stop structure carried by each said transfer member for engagement with the front corners of a box structure, gripping structure carried by each said transfer member for engagement with the rear corners of a box structure to support a box structure between said stop structure and said gripping structure, a suction member carried by each said transfer member for engagement with the leading unapplied panel of a box wrapper assembly, ejector means carried by each said transfer member for ejecting a box assembly from said second station upon transfer of a succeeding box assembly to said second station from said first-named station, and means for adjusting as a unit along each said transfer member said stop structure, said suction member and said ejector means carried thereby to accommodate box assembies of different dimensions.

17. In a box-wrapping machine a transfer mechanism movable between two stations for transferring assemblies of box structure and its partially applied wrapper from one station to a second station comprising a pair of spaced transfer members, stop structure carried by each said transfer member for engagement with the front corners of a box structure, gripping structure carried by each said transfer member for engagement with the rear corners of a box structure to support a box structure between said stop structure and said gripping structure, a suction member carried by each said transfer member for engagement with the leading unapplied panel of a box wrapper assembly, ejector means carried by each said transfer member for ejecting a box assembly from said second station upon transfer of a succeeding box assembly to said second station from said first-named station, means for adjusting within predetermined limits the spacing between said transfer members, and means for adjusting as a unit along each said transfer member within predetermined limits said corresponding stop structure, suction member and ejector means to accommodate box assemblies of various dimensions within said predetermined limits.

18. A system comprising a cyclically operable conveyor for intermittently transporting assemblies of box structure and partially applied sheet material, displaceable stop structure extending transversely of the conveyor, said conveyor in each cycle delivering a box assembly against said stop structure, cyclically operable wrapping mechanism disposed adjacent one side of said conveyor comprising a delivery station, a wrapping station, and form-block structure reciprocable through said stations, said form-block structure in each cycle moving a box assembly from said delivery station through said wrapping station, and transfer mechanism for the box assemblies disposed to the same side of said conveyor as said wrapping mechanism, said transfer mechanism being movable in each cycle after said form-block structure has moved a box assembly from said delivery station toward said wrapping station to engage said stop structure after said stop structure has arrested a subsequent box assembly to displace said stop structure and embrace the subsequent box assembly in the position arrested by said stop structure.

19. A system comprising a cyclically operable conveyor for intermittently transporting assemblies of box structure and partially applied sheet material, displaceable stop structure extending transversely of the conveyor, said conveyor in each cycle delivering a box assembly against said stop structure, cyclically operable wrapping mechanism disposed adjacent one side of said conveyor comprising a delivery station, a wrapping station, and form-block structure reciprocable through said stations, said form-block structure in each cycle moving a box assembly from said delivery station through said wrapping station, and transfer mechanism for the box assemblies disposed to the same side of said conveyor as said wrapping mechanism, said transfer mechanism being movable in each cycle after said form-block structure has moved a box assembly from said delivery station toward said wrapping station to engage said stop structure after said stop structure has arrested a subsequent box assembly to displace said stop structure and embrace the subsequent box assembly in the position arrested by said stop structure, and said transfer mechanism being operable in a reverse direction to transfer the subsequent box assembly from the position arrested by said stop structure to said delivery station after said form-block structure has passed through said delivery station in reverse direction.

20. A system comprising a cylically operable conveyor for intermittently transporting assemblies of box structure and partially applied sheet material, displaceable stop structure extending transversely of the conveyor, said conveyor in each cycle delivering a box assembly against said stop structure, cyclically operable wrapping mechanism disposed adjacent one side of said conveyor comprising a delivery station, a wrapping station, and form-block structure reciprocable through said stations, said form-block structure in each cycle moving a box assembly from said delivery station through said wrapping station, and transfer mechanism including ejecting means moveable therewith for the box assemblies disposed to the same side of said conveyor as said wrapping mechanism, said transfer mechanism being movable in each cycle after said form-block structure has moved a box assembly from said delivery station toward said wrapping station to engage said stop structure after said stop structure has arrested a subsequent box assembly to displace said stop structure and embrace the subsequent box assembly in the position arrested by said stop structure, and said transfer mechanism being operable in a reverse direction for removal by said ejecting means from said delivery station of the box assembly wrapped in the prior cycle of the wrapping mechanism and for delivery to said delivery station of the subsequent box assembly after said form-block structure has passed through said delivery station in reverse direction.

21. In a box-wrapping machine including a frame and having sheet-applying mechanism and vertically reciprocating form-block structure for wrapping assemblies of box structure and partially applied sheet material, spaced transfer members for pulling box assemblies into the path of said form-block structure, supporting means common to said transfer members and said sheet-applying mechanism, said supporting means being carried by said frame, and means for adjusting within predetermined limits the spacing of said transfer members to accommodate box assemblies of different size within said predetermined limits, said sheet-applying mechanism being correspondingly adjusted for the box assemblies of different size concurrently with adjustment of the spacing of said transfer members.

22. In a box machine including reciprocating form-block structure, the combination of spaced transfer members reciprocating in unison on opposite sides of the path of said form-block structure, guides for supporting said transfer members to determine the path of movement of said transfer members, a reciprocating carriage for driving said transfer members, and means for coupling said transfer members to said reciprocating carriage to permit relative movement of said transfer members in said guides in a direction transverse to the reciprocating movement of said transfer members for preventing binding of said transfer members in said guides.

23. In a box-wrapping machine having a frame, vertically reciprocating form-block structure supported within the frame and tool slides supported at opposite sides of the frame for supporting wrapping tools in encompassing relation to the path of the form-block structure, means for pulling assemblies of box structure and partially applied sheet material into the path of the form-block structure comprising spaced members horizontally reciprocating in unison on opposite sides of the path of the form-block structure and free of any interconnecting structure which crosses the path or which obstructs the space between the forward ends of said members and the path, guides for supporting said members to determine the path of movement of said members, said guides being carried by and adjustable with an opposed pair of the wrapping tool slides, a reciprocating carriage for driving said spaced members, means for coupling the rear ends of said spaced members to said reciprocating carriage to permit relative movement of said spaced members in said guides in a direction transverse to the reciprocating movement of said spaced members, gripping means carried at the forward ends of said spaced members to support a box assembly for movement into the path of the form-block structure, and ejecting structure carried by said spaced members for ejecting a wrapped box assembly from the path of the form-block structure during the movement of a succeeding assembly of box structure and partially applied sheet material into the path thereof.

24. In a system including form-block structure and a conveyor for transporting assemblies of box structure registered on sheet material to a transfer station thereon adjacent the form-block structure, adjustable side stops supported at the transfer station, means for prealigning the box assemblies to clear said side stops during movement by the conveyor, and mechanism operable to move the assemblies against said side stops to embrace the assemblies and transport them in succession into the path of the form-block structure.

25. In a system including form-block structure and a conveyor for transporting assemblies of box structures registered on sheet material to a transfer station thereon adjacent the path of movement of the form-block structure, adjustable side stop structure supported at the transfer station, a movable end stop supported at the transfer station for arresting movement of the box assemblies by the conveyor, and mechanism operable to displace said end stop from said arresting position and to move the assemblies against said side stop structure to embrace the assemblies and transport them in succession into the path of the form-block structure.

26. In a box machine including reciprocating form-block structure, means for moving box structures from a transfer station into the path of said form-block structure comprising a reciprocable carriage, transfer members carried by said carriage which straddle the path of movement of the form-block structure and move over said transfer station, yielding fingers carried by said transfer members for engagement with the back corners of box structure, stop structure carried by said transfer members and spaced from said yielding fingers for engagement with the front corners of box structure, said yielding fingers being adapted to yield from the path of movement of the box structure upon movement of said transfer members toward said transfer station and at the limit of said movement at said transfer station to press against the rear corners of the box structure to force the forward corners of the box structure against said stop structure on said transfer members, thereby gripping the box structure for movement from said transfer station into the path of said form-block structure.

27. In a box-making apparatus including a conveyor for delivering box assemblies of box structure and partially applied sheet material to a transfer station, and sheet-applying mechanism adjacent the transfer station including vertically reciprocating form-block structure, the combination of reciprocable transfer structure adapted to grip the corners of box structure and the leading flap of partially applied sheet material for pulling box assemblies into the path of the form-block structure, driving means including a mutilated gear and cam structure rotatable with said gear, driven means including a shaft and a pinion carried thereby for engagement with said gear, a locking member rotatable with said pinion and adapted for engagement with said cam, said locking member and said cam cooperating in a manner periodically to lock said driven shaft against rotation to provide dwell intervals, and an operative connection between said driven shaft and said transfer structure to translate the rotational movement of said driven shaft into linear movement of said transfer structure for reciprocating said transfer structure in timed relation to reciprocation of the form-block structure to wrap sheet material about box structure by means of the sheet-applying mechanism during the dwell intervals.

28. In a box machine having reciprocating form-block structure and a conveyor for transporting assemblies of box structure and partially applied sheet material adjacent the path of the form-block structure, reciprocating structure for moving an assembly of box structure and partially applied sheet material from the conveyor into the path of the form-block structure, and suction means carried by said reciprocating structure for supporting the leading unapplied panel of said sheet material during said movement of the assembly by said reciprocating structure, said suction means being carried by said reciprocating structure in a position with respect to the surface of the conveyor such that said suction means is engageable with said leading panel prior to displacement of said leading panel from the surface of the conveyor.

29. In a system for wrapping boxes including a conveyor for step-by-step transportation of assemblies each comprising a box and a partially applied wrapper along the center line of the conveyor, a box-wrapping machine disposed adjacent one side of the conveyor and having reciprocating form-block structure and stop structure for arresting each assembly in turn on the conveyor at a receiving station in alignment with form-block structure of the wrapping machine, an assembly transfer device disposed at the opposite side of the form-block from said conveyor having a fixed stroke corresponding to the distance between the center line of the conveyor and the axis of movement of the form-block structure, and operating means for said transfer device to provide a dwell of said transfer device at an assembly delivery station in the path of movement of the form-block structure while the form-block structure is away therefrom and to move said transfer device toward and back from said assembly receiving station without pause thereat successively to pull box assemblies from said assembly receiving station to said assembly delivery station.

30. A box transfer structure comprising a pair of spaced members reciprocable in unison, a pair of yielding grippers respectively pivotally mounted at the forward end of said spaced members, and a pair of fixed gripper members respectively mounted on said spaced members intermediate the forward and rear ends thereof, said yielding gripper members being adapted slidably to engage the end walls of a box and then engage the rear wall of the box to force the front wall of the box against said fixed gripper members, thereby to grip the box between said gripping members.

31. A box transfer structure comprising a pair of spaced parallel members reciprocable in unison, a pair of yielding grippers respectively pivotally mounted at the forward end of said spaced members, and a pair of fixed gripper members respectively mounted on said spaced members intermediate the forward and rear ends thereof, said yielding gripper members being adapted slidably to engage the end walls of a box and then engage the rear wall of the box to force the front wall of the box against said fixed gripper members, thereby to grip the box between said gripping members, the spacing between the rear ends of said spaced members being greater than the spacing between the forward ends of said spaced members to permit a box to be removed from between said gripping members and passed between the rear ends of said spaced members without contact therewith.

32. In a box machine including reciprocating form-block structure, the combination of means for pulling boxes into the path of said form-block structure comprising spaced parallel transfer members reciprocating in unison on opposite sides of the path of said form-block structure, gripping structure carried at the forward ends of said transfer members for gripping a box therebetween, said forward ends of said transfer members being adapted to maintain the end walls of the box in substantially parallel vertical planes during movement of the box into the path of said form-block structure, and ejecting structure carried by each said transfer member for ejecting a box from the path of said form-block structure and between the rear ends of said transfer members during movement of a succeeding box into the path of said form-block structure, the spacing between the rear ends of said transfer members being greater than the spacing between the forward ends thereof to permit freedom of movement of the box during the ejecting operation.

33. In a box-making system the combination of reciprocating form-block structure, a transfer station adjacent the path of said structure, transfer structure disposed at the opposite side of the form-block from the transfer station and operable to pull box structure from said transfer station into the path of said form-block structure, and means for cyclically imparting intermittent linear movement to said transfer structure of a relatively long and accurately controlled stroke to provide dwells of the transfer structure of proper duration and sequence timed with the movements of said form-block structure and for continuous automatic positive register of transferred box structure with said form-block structure comprising driving means including a continuously rotatable driving shaft and a mutilated gear carried thereon, driven means including a driven shaft and a pinion carried thereon, said pinion and said mutilated gear being operatively connected for intermittent rotation of said driven shaft, and a crank carried by said driven shaft and operatively connected to said transfer structure for translating the rotational movement of said driven shaft into a precise linear movement both as to time and displacement of said transfer structure, said crank on said driven shaft having a positional relationship with respect to the portion of said mutilated gear which is devoid of teeth providing a dwell of said transfer structure at the path of said form-block structure followed by continuous movement of said transfer structure to said transfer station and back to the path of said form-block structure during each cycle of said box-making system.

34. In a box-making system the combination of reciprocating form-block structure, a transfer station adjacent the path of said structure, transfer structure disposed at the opposite side of the form-block from the transfer station and operable to pull box structure from said transfer station into the path of said form-block structure, means for cyclically imparting intermittent linear movement to said transfer structure of a relatively long and accurately controlled stroke to provide dwells of the transfer structure of proper duration and sequence timed with the movements of said form-block structure and for continuous automatic positive register of transferred box structure with said form-block structure comprising driving means including a continuously rotatable driving shaft and a mutilated gear carried thereon, driven means including a driven shaft and a pinion carried thereon, said pinion and said mutilated gear being operatively connected for intermittent rotation of said driven shaft, a crank carried by said driven shaft and operatively connected to said transfer structure for translating the rotational movement of said driven shaft into a precise linear movement both as to time and displacement of said transfer structure, said crank on said driven shaft having a positional relationship with respect to the portion of said mutilated gear which is devoid of teeth providing a dwell of said transfer structure at the path of said form-block structure followed by continuous movement of said transfer structure to said transfer station and back to the path of said form-block structure during each cycle of said box-making system, and cooperating stop structure on said driving and driven shafts to lock said transfer structure in the dwell position during the dwell portion of each cycle.

35. In a box-making system of the type including a conveyor for delivering assemblies of box structure and partially applied sheet material to a transfer station and sheet-applying mechanism adjacent the transfer station including vertically reciprocating form-block structure wherein said system is capable of handling boxes varying in size over a wide range thus requiring a relatively long transfer movement of the box assemblies from the transfer station into the path of the reciprocating form-block structure, the combination therewith of transfer structure disposed at the opposite side of the form-block from the conveyor and operable to pull box assemblies from the transfer station into the path of the form-block structure, driving means including a shaft, a mutilated gear and cam secured thereto for rotation with said shaft, driven means including a pinion carried by a driven shaft for engagement with said gear, a locking element carried by said driven shaft for engagement with said cam, said locking element and said cam cooperating in a manner to lock said driven shaft in a fixed position during a predetermined portion of the cycle of the box machine, and said driven shaft having a crank operatively connected with said transfer structure for translating the rotational movement of said driven shaft into linear movement of said transfer structure and imparting intermittent reciprocating movement thereto.

36. In a box-wrapping system including a conveyor for transfering box structure to a transfer station, the combination of movable stop structure normally disposed at said transfer station for engaging a box structure to prevent further movement thereof by said conveyor, transfer mechanism adapted to remove a box structure from said transfer station for movement of the box structure to another station, and means operable in timed relation with said transfer mechanism for moving said stop structure out of engagement with the box structure to permit engagement of the box structure by said transfer mechanism for transfer to said other station.

37. In a box-making system the combination of reciprocating form-block structure, a transfer station adjacent the path of said structure, transfer structure operable to move box structure from said transfer station into the path of said form-block structure, and means for cyclically imparting intermittent linear movement to said transfer structure of a relatively long and accurately controlled stroke to provide dwells of the transfer structure of proper duration and sequence timed with the movements of said form-block structure and for continuous automatic positive register of transferred box structure with said form-block structure comprising driving means including a mutilated gear adapted for continuous rotation, driven means including a pinion, said pinion and said mutilated gear being operatively connected for intermittent rotation of said driven means, and a crank carried by said driven means and operatively connected to said transfer structure for translating the rotational movement of said driven means into a precise linear movement both as to time and displacement of said transfer structure, said crank on said driven means having a positional relationship with respect to the portion of said mutilated gear which is devoid of teeth providing a dwell of said transfer structure at the path of said form-block structure followed by continuous movement of said transfer structure to said transfer station and back to the path of said form-block structure during each cycle of said box-making system.

38. A box transfer structure comprising a pair of spaced transfer members reciprocable in unison, a pair of yielding gripper members, one carried by each of said transfer members at the end thereof first to engage the box, and a pair of fixed gripper members one carried by each of said transfer members spaced from said yielding gripper members subsequently to engage the box, said yielding gripper members being adapted slidably to engage the end walls of the box and then engage the rear wall of the box to force the front wall of the box against said fixed gripper members, thereby to grip the box between said fixed and yielding gripper members.

References Cited in the file of this patent

UNITED STATES PATENTS

| | | |
|---|---|---|
| 1,160,796 | Waite | Nov. 16, 1915 |
| 1,196,328 | Braden | Aug. 29, 1916 |
| 1,560,373 | Birnstock | Nov. 3, 1925 |
| 1,804,094 | Federwitz et al. | May 5, 1931 |
| 1,822,054 | Melville | Sept. 8, 1931 |
| 1,902,079 | Johnson | Mar. 21, 1933 |
| 2,208,978 | Harrold et al. | July 23, 1940 |
| 2,260,684 | Root | Oct. 28, 1941 |
| 2,353,789 | Schieman | July 18, 1944 |
| 2,489,837 | Von Hofe | Nov. 29, 1949 |

FOREIGN PATENTS

| | | |
|---|---|---|
| 514,380 | Germany | Dec. 13, 1930 |
| 532,469 | Germany | Aug. 28, 1931 |
| 629,796 | Germany | May 12, 1936 |

OTHER REFERENCES

Technical Service Bulletin, E. I. du Pont de Nemours & Co., Inc. Plastic Department. April 1, 1949, Revised, No. 13.

"A New Industrial Resin" in Modern Plastics for June 1946, pages 134–135.